United States Patent
Solapurkar

(10) Patent No.: US 11,075,987 B1
(45) Date of Patent: Jul. 27, 2021

(54) LOAD ESTIMATING CONTENT DELIVERY NETWORK

(71) Applicant: Amazon Technologies, Inc., Seattle, WA (US)

(72) Inventor: Chaitanya Ashok Solapurkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 15/620,472

(22) Filed: Jun. 12, 2017

(51) Int. Cl.
H04L 29/08 (2006.01)

(52) U.S. Cl.
CPC ...... *H04L 67/1023* (2013.01); *H04L 67/2842* (2013.01)

(58) Field of Classification Search
CPC .......................... H04L 47/125; H04L 67/1023
See application file for complete search history.

(56) References Cited

U.S. PATENT DOCUMENTS

| | | | |
|---|---|---|---|
| 5,063,500 A | 11/1991 | Shorter | |
| 5,341,477 A | 8/1994 | Pitkin et al. | |
| 5,459,837 A | 10/1995 | Caccavale | |
| 5,611,049 A | 3/1997 | Pitts | |
| 5,627,889 A | 3/1997 | Eslambolchi | |
| 5,701,467 A | 12/1997 | Freeston | |
| 5,764,910 A | 6/1998 | Shachar | |
| 5,774,660 A | 6/1998 | Brendel et al. | |
| 5,815,649 A | 9/1998 | Utter et al. | |
| 5,852,717 A | 12/1998 | Bhide et al. | |
| 5,892,914 A | 4/1999 | Pitts | |
| 5,893,116 A | 4/1999 | Simmonds et al. | |

(Continued)

FOREIGN PATENT DOCUMENTS

| | | |
|---|---|---|
| CA | 2741 895 A1 | 5/2010 |
| CA | 2765397 A1 | 2/2011 |

(Continued)

OTHER PUBLICATIONS

Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.

(Continued)

*Primary Examiner* — Andrew C Georgandellis
(74) *Attorney, Agent, or Firm* — Knobbe Martens Olson & Bear LLP

(57) ABSTRACT

A CDN that employs a load balancer that uses probabilistic filters to estimate sizes of requested data objects and that balances incoming request loads according to the estimated sizes is provided herein. For example, the load balancer stores probabilistic filters. Each probabilistic filter is associated with a size range. When the CDN receives a data object request, the load balancer generates a cache key and tests whether the cache key is a member of any probabilistic filter. If the cache key is a member of a probabilistic filter, then the load balancer estimates a size of the requested data object based on the probabilistic filter of which the cache key is a member. The load balancer then uses the estimated size to estimate the added load on one or more cache servers. Based on the estimated added load, the load balancer selects a cache server to handle the request.

20 Claims, 7 Drawing Sheets

(56) References Cited

U.S. PATENT DOCUMENTS

| | | |
|---|---|---|
| 5,895,462 A | 4/1999 | Toki |
| 5,905,248 A | 5/1999 | Russell et al. |
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |
| 5,999,274 A | 12/1999 | Lee et al. |
| 6,006,264 A | 12/1999 | Colby et al. |
| 6,016,512 A | 1/2000 | Huitema |
| 6,018,619 A | 1/2000 | Allard et al. |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A | 11/2000 | Ansell et al. |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,209 B1 | 4/2001 | Watson |
| 6,223,288 B1 | 4/2001 | Byrne |
| 6,243,761 B1 | 6/2001 | Mogul et al. |
| 6,256,671 B1 | 7/2001 | Strentzsch et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,389,532 B1 | 5/2002 | Gupta et al. |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,513,112 B1 | 1/2003 | Craig et al. |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,564,380 B1 | 5/2003 | Murphy |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,687,846 B1 | 2/2004 | Adrangi et al. |
| 6,694,358 B1 | 2/2004 | Swildens et al. |
| 6,697,805 B1 | 2/2004 | Choquier et al. |
| 6,718,324 B2 | 4/2004 | Edlund et al. |
| 6,724,770 B1 | 4/2004 | Van Renesse |
| 6,732,237 B1 | 5/2004 | Jacobs et al. |
| 6,748,413 B1 * | 6/2004 | Bournas ............... G06F 9/505 709/200 |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 7/2005 | Orbits et al. |
| 6,925,499 B1 | 8/2005 | Chen et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,944,167 B1 | 9/2005 | McPherson |
| 6,950,848 B1 | 9/2005 | Yousefi'zadeh et al. |
| 6,961,783 B1 | 9/2005 | Cook et al. |
| 6,963,850 B1 | 11/2005 | Bezos et al. |
| 6,968,389 B1 | 11/2005 | Menditto et al. |
| 6,976,090 B2 | 12/2005 | Ben-Shaul et al. |
| 6,981,017 B1 | 12/2005 | Kasriel et al. |
| 6,981,025 B1 | 12/2005 | Frazier et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,027,582 B2 | 4/2006 | Khello et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,062,158 B1 | 6/2006 | Ayaki |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,095,715 B2 | 8/2006 | Buckman et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |

(56) References Cited

U.S. PATENT DOCUMENTS

| | | | |
|---|---|---|---|
| 7,149,747 | B1 | 12/2006 | Cheng et al. |
| 7,149,809 | B2 | 12/2006 | Barde et al. |
| 7,152,118 | B2 | 12/2006 | Anderson, IV et al. |
| 7,162,539 | B2 | 1/2007 | Garcie-Luna-Aceves |
| 7,165,117 | B1 | 1/2007 | Sitaraman et al. |
| 7,171,469 | B2 | 1/2007 | Ackaouy et al. |
| 7,174,382 | B2 | 2/2007 | Ramanathan et al. |
| 7,185,046 | B2 | 2/2007 | Ferstl et al. |
| 7,185,063 | B1 | 2/2007 | Kasriel et al. |
| 7,185,084 | B2 | 2/2007 | Sirivara et al. |
| 7,188,214 | B1 | 3/2007 | Kasriel et al. |
| 7,194,522 | B1 | 3/2007 | Swildens et al. |
| 7,194,552 | B1 | 3/2007 | Schneider |
| 7,200,667 | B2 | 4/2007 | Teodosiu et al. |
| 7,200,673 | B1 | 4/2007 | Augart |
| 7,216,170 | B2 | 5/2007 | Ludvig et al. |
| 7,225,254 | B1 | 5/2007 | Swildens et al. |
| 7,228,350 | B2 | 6/2007 | Hong et al. |
| 7,228,359 | B1 | 6/2007 | Monteiro |
| 7,233,978 | B2 | 6/2007 | Overton et al. |
| 7,240,100 | B1 | 7/2007 | Wein et al. |
| 7,249,196 | B1 | 7/2007 | Peiffer et al. |
| 7,251,675 | B1 | 7/2007 | Kamakura et al. |
| 7,254,626 | B1 | 8/2007 | Kommula et al. |
| 7,254,636 | B1 | 8/2007 | O'Toole, Jr. et al. |
| 7,257,581 | B1 | 8/2007 | Steele et al. |
| 7,260,598 | B1 | 8/2007 | Liskov et al. |
| 7,260,639 | B2 | 8/2007 | Afergan et al. |
| 7,269,784 | B1 | 9/2007 | Kasriel et al. |
| 7,272,227 | B1 | 9/2007 | Beran |
| 7,274,658 | B2 | 9/2007 | Bornstein et al. |
| 7,284,056 | B2 | 10/2007 | Ramig |
| 7,289,519 | B1 | 10/2007 | Liskov |
| 7,293,093 | B2 | 11/2007 | Leighton |
| 7,308,499 | B2 | 12/2007 | Chavez |
| 7,310,686 | B2 | 12/2007 | Uysal |
| 7,316,648 | B2 | 1/2008 | Kelly et al. |
| 7,318,074 | B2 | 1/2008 | Iyengar et al. |
| 7,320,131 | B1 | 1/2008 | O'Toole, Jr. |
| 7,321,918 | B2 | 1/2008 | Burd et al. |
| 7,337,968 | B2 | 3/2008 | Wilz, Sr. et al. |
| 7,339,937 | B2 | 3/2008 | Mitra et al. |
| 7,340,505 | B2 | 3/2008 | Lisiecki et al. |
| 7,343,397 | B2 | 3/2008 | Kochanski |
| 7,350,075 | B1 | 3/2008 | Eastham et al. |
| 7,362,703 | B1 | 3/2008 | Taft et al. |
| 7,363,291 | B1 | 4/2008 | Page |
| 7,363,626 | B2 | 4/2008 | Koutharapu et al. |
| 7,370,089 | B2 | 5/2008 | Boyd et al. |
| 7,372,809 | B2 | 5/2008 | Chen |
| 7,373,416 | B2 | 5/2008 | Kagan et al. |
| 7,376,716 | B2 | 5/2008 | Dilley et al. |
| 7,376,736 | B2 | 5/2008 | Sundaram et al. |
| 7,380,078 | B2 | 5/2008 | Ikegaya et al. |
| 7,389,354 | B1 | 6/2008 | Sitaraman et al. |
| 7,392,236 | B2 | 6/2008 | Rusch et al. |
| 7,398,301 | B2 | 7/2008 | Hennessey et al. |
| 7,406,512 | B2 | 7/2008 | Swildens et al. |
| 7,406,522 | B2 | 7/2008 | Riddle |
| 7,409,712 | B1 | 8/2008 | Brooks et al. |
| 7,430,610 | B2 | 9/2008 | Pace et al. |
| 7,441,045 | B2 | 10/2008 | Skene et al. |
| 7,441,261 | B2 | 10/2008 | Slater et al. |
| 7,451,230 | B2 | 10/2008 | Corrado et al. |
| 7,454,457 | B1 | 11/2008 | Lowery et al. |
| 7,454,500 | B1 | 11/2008 | Hsu et al. |
| 7,461,170 | B1 | 12/2008 | Taylor et al. |
| 7,464,142 | B2 | 12/2008 | Flurry et al. |
| 7,472,201 | B1 | 12/2008 | Aitken |
| 7,478,148 | B2 | 1/2009 | Neerdaels |
| 7,492,720 | B2 | 2/2009 | Pruthi et al. |
| 7,496,651 | B1 | 2/2009 | Joshi |
| 7,499,998 | B2 | 3/2009 | Toebes et al. |
| 7,502,836 | B1 | 3/2009 | Menditto et al. |
| 7,505,464 | B2 | 3/2009 | Okmianski et al. |
| 7,506,034 | B2 | 3/2009 | Coates et al. |
| 7,519,705 | B1 | 3/2009 | Papagiannaki et al. |
| 7,519,720 | B2 | 4/2009 | Fishman et al. |
| 7,519,726 | B2 | 4/2009 | Palliyil et al. |
| 7,523,181 | B2 | 4/2009 | Swildens et al. |
| 7,543,024 | B2 | 6/2009 | Holstege |
| 7,548,947 | B2 | 6/2009 | Kasriel et al. |
| 7,552,235 | B2 | 6/2009 | Chase et al. |
| 7,555,542 | B1 | 6/2009 | Ayers et al. |
| 7,561,571 | B1 | 7/2009 | Lovett et al. |
| 7,565,407 | B1 | 7/2009 | Hayball |
| 7,568,032 | B2 | 7/2009 | Feng et al. |
| 7,573,916 | B1 | 8/2009 | Bechtolsheim et al. |
| 7,574,499 | B1 | 8/2009 | Swildens et al. |
| 7,581,009 | B1 | 8/2009 | Hsu et al. |
| 7,584,507 | B1 | 9/2009 | Nucci |
| 7,593,935 | B2 | 9/2009 | Sullivan |
| 7,594,189 | B1 | 9/2009 | Walker et al. |
| 7,596,619 | B2 | 9/2009 | Leighton et al. |
| 7,603,439 | B2 | 9/2009 | Dilley et al. |
| 7,613,815 | B1 | 10/2009 | Prakash et al. |
| 7,617,222 | B2 | 11/2009 | Coulthard et al. |
| 7,623,460 | B2 | 11/2009 | Miyazaki |
| 7,624,169 | B2 | 11/2009 | Lisiecki et al. |
| 7,624,264 | B2 | 11/2009 | Aura et al. |
| 7,626,940 | B2 | 12/2009 | Jain |
| 7,631,101 | B2 | 12/2009 | Sullivan et al. |
| 7,631,310 | B1 * | 12/2009 | Henzinger ............... G06F 9/505 707/999.007 |
| 7,640,296 | B2 | 12/2009 | Fuchs et al. |
| 7,650,376 | B1 | 1/2010 | Blumenau |
| 7,653,700 | B1 | 1/2010 | Bahl et al. |
| 7,653,725 | B2 | 1/2010 | Yahiro et al. |
| 7,657,613 | B1 | 2/2010 | Hanson et al. |
| 7,657,622 | B1 | 2/2010 | Douglis et al. |
| 7,661,027 | B2 | 2/2010 | Langen et al. |
| 7,664,831 | B2 | 2/2010 | Cartmell et al. |
| 7,664,879 | B2 | 2/2010 | Chan et al. |
| 7,676,570 | B2 | 3/2010 | Levy et al. |
| 7,680,897 | B1 | 3/2010 | Carter et al. |
| 7,684,394 | B1 | 3/2010 | Cutbill et al. |
| 7,685,109 | B1 | 3/2010 | Ransil et al. |
| 7,685,251 | B2 | 3/2010 | Houlihan et al. |
| 7,685,270 | B1 | 3/2010 | Vermeulen et al. |
| 7,685,273 | B1 | 3/2010 | Anastas et al. |
| 7,693,813 | B1 | 4/2010 | Cao et al. |
| 7,693,959 | B2 | 4/2010 | Leighton et al. |
| 7,698,418 | B2 | 4/2010 | Shimada et al. |
| 7,702,724 | B1 | 4/2010 | Brydon et al. |
| 7,706,740 | B2 | 4/2010 | Collins et al. |
| 7,707,071 | B2 | 4/2010 | Rigole |
| 7,707,314 | B2 | 4/2010 | McCarthy et al. |
| 7,711,647 | B2 | 5/2010 | Gunaseelan et al. |
| 7,711,788 | B2 | 5/2010 | Lev Ran et al. |
| 7,716,367 | B1 | 5/2010 | Leighton et al. |
| 7,725,602 | B2 | 5/2010 | Liu et al. |
| 7,725,658 | B2 | 5/2010 | Lang et al. |
| 7,730,187 | B2 | 6/2010 | Raciborski et al. |
| 7,739,400 | B2 | 6/2010 | Lindbo et al. |
| 7,747,720 | B2 | 6/2010 | Toebes et al. |
| 7,748,005 | B2 | 6/2010 | Romero et al. |
| 7,756,017 | B2 | 7/2010 | Goyal et al. |
| 7,756,913 | B1 | 7/2010 | Day |
| 7,756,965 | B2 | 7/2010 | Joshi |
| 7,757,202 | B2 | 7/2010 | Dahlsted et al. |
| 7,761,572 | B1 | 7/2010 | Auerbach |
| 7,765,295 | B2 | 7/2010 | Anastas et al. |
| 7,765,304 | B2 | 7/2010 | Davis et al. |
| 7,769,823 | B2 | 8/2010 | Jenny et al. |
| 7,773,596 | B1 | 8/2010 | Marques |
| 7,774,342 | B1 | 8/2010 | Virdy |
| 7,783,727 | B1 | 8/2010 | Foley et al. |
| 7,787,380 | B1 | 8/2010 | Aggarwal et al. |
| 7,792,989 | B2 | 9/2010 | Toebes et al. |
| 7,805,516 | B2 | 9/2010 | Kettler et al. |
| 7,809,597 | B2 | 10/2010 | Das et al. |
| 7,813,308 | B2 | 10/2010 | Reddy et al. |
| 7,814,229 | B1 | 10/2010 | Cabrera et al. |
| 7,818,454 | B2 | 10/2010 | Kim et al. |

(56) References Cited

U.S. PATENT DOCUMENTS

| | | |
|---|---|---|
| 7,827,256 B2 | 11/2010 | Phillips et al. |
| 7,836,177 B2 | 11/2010 | Kasriel et al. |
| 7,853,680 B2 | 12/2010 | Phatak |
| 7,853,719 B1 | 12/2010 | Cao et al. |
| 7,860,735 B2 | 12/2010 | Evanitsky |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,890,989 B1 | 2/2011 | Hofrichter et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,713 B1 | 4/2011 | Day et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,456 B2 | 4/2011 | McGrath |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,961,736 B2 | 6/2011 | Ayyagari |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,404 B2 | 8/2011 | Wong et al. |
| 7,996,533 B2 | 8/2011 | Leighton et al. |
| 7,996,535 B2 | 8/2011 | Auerbach |
| 8,000,724 B2 | 8/2011 | Rayburn et al. |
| 8,001,187 B2 | 8/2011 | Stochosky |
| 8,010,705 B1 | 8/2011 | Sebastian et al. |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,051,166 B1 | 10/2011 | Baumback et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,079,087 B1 | 12/2011 | Spies et al. |
| 8,082,348 B1 | 12/2011 | Averbuj et al. |
| 8,099,487 B1 | 1/2012 | Smirnov et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,155,126 B1 | 3/2012 | Mao et al. |
| 8,156,199 B1 | 4/2012 | Hoche-Mong et al. |
| 8,156,243 B2 | 4/2012 | Richardson et al. |
| 8,161,184 B2 | 4/2012 | Sekar et al. |
| 8,165,915 B1 | 4/2012 | Lucash |
| 8,175,863 B1 | 5/2012 | Ostermeyer et al. |
| 8,180,720 B1 | 5/2012 | Kovacs et al. |
| 8,190,682 B2 | 5/2012 | Paterson-Jones et al. |
| 8,195,605 B2 | 5/2012 | Chellappa et al. |
| 8,195,837 B2 | 6/2012 | McCarthy et al. |
| 8,209,695 B1 | 6/2012 | Pruyne et al. |
| 8,218,965 B1 | 7/2012 | Uhlhorn et al. |
| 8,224,942 B1 | 7/2012 | Presotto et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,260,914 B1 | 8/2012 | Ranjan |
| 8,261,062 B2 | 9/2012 | Aura et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,286,176 B1 | 10/2012 | Baumback et al. |
| 8,291,046 B2 | 10/2012 | Farber et al. |
| 8,291,117 B1 | 10/2012 | Eggleston et al. |
| 8,296,375 B1 | 10/2012 | Katzer et al. |
| 8,296,393 B2 | 10/2012 | Alexander et al. |
| 8,296,429 B2 | 10/2012 | Baumback et al. |
| 8,296,786 B2 | 10/2012 | Faust et al. |
| 8,301,600 B1 | 10/2012 | Helmick et al. |
| 8,301,645 B1 | 10/2012 | Crook |
| 8,316,124 B1 | 10/2012 | Baumback et al. |
| 8,321,568 B2 | 11/2012 | Sivasubramanian et al. |
| 8,321,588 B2 | 11/2012 | Richardson et al. |
| 8,331,370 B2 | 11/2012 | Hamilton et al. |
| 8,341,745 B1 | 12/2012 | Chat et al. |
| 8,356,074 B1 | 1/2013 | Ehrlich et al. |
| 8,380,831 B2 | 2/2013 | Barber |
| 8,380,851 B2 | 2/2013 | McCarthy et al. |
| 8,392,928 B1 | 3/2013 | Forys et al. |
| 8,396,908 B2 | 3/2013 | Moore et al. |
| 8,402,137 B2 | 3/2013 | Sivasuramanian et al. |
| 8,423,408 B1 | 4/2013 | Barnes et al. |
| 8,423,662 B1 | 4/2013 | Weihl et al. |
| 8,433,749 B2 | 4/2013 | Wee et al. |
| 8,443,167 B1 | 5/2013 | Fallone et al. |
| 8,447,831 B1 | 5/2013 | Sivasubramanian et al. |
| 8,447,854 B1 | 5/2013 | Jasinskyj |
| 8,447,876 B2 | 5/2013 | Verma et al. |
| 8,452,745 B2 | 5/2013 | Ramakrishna |
| 8,452,870 B2 | 5/2013 | Baumback et al. |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,883 B2 | 7/2013 | Day et al. |
| 8,478,903 B2 | 7/2013 | Farber et al. |
| 8,489,737 B2 | 7/2013 | Baumback et al. |
| 8,504,721 B2 | 8/2013 | Hsu et al. |
| 8,504,775 B2 | 8/2013 | Plamondon |
| 8,510,428 B2 | 8/2013 | Joshi |
| 8,510,807 B1 | 8/2013 | Elazary et al. |
| 8,516,082 B2 | 8/2013 | Cadwell et al. |
| 8,521,851 B1 | 8/2013 | Richardson |
| 8,521,876 B2 | 8/2013 | Goodman et al. |
| 8,521,880 B1 | 8/2013 | Richardson et al. |
| 8,521,885 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,645 B1 | 9/2013 | Proffit et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,963 B2 | 11/2013 | Trahan et al. |
| 8,577,992 B1 | 11/2013 | Richardson et al. |
| 8,589,996 B2 | 11/2013 | Ma et al. |
| 8,606,926 B2 | 12/2013 | Ulevitch |
| 8,606,996 B2 | 12/2013 | Richardson et al. |
| 8,612,565 B2 | 12/2013 | Schneider |
| 8,612,588 B1 | 12/2013 | Ehrlich et al. |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |

(56) References Cited

U.S. PATENT DOCUMENTS

| | | |
|---|---|---|
| 8,645,700 B2 | 2/2014 | Smith et al. |
| 8,667,127 B2 | 2/2014 | Bettis et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,694,642 B2 | 4/2014 | Dempsky et al. |
| 8,712,950 B2 | 4/2014 | Smith et al. |
| 8,732,309 B1 | 5/2014 | Richardson et al. |
| 8,738,766 B1 | 5/2014 | Kazerani et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,762,526 B2 | 6/2014 | Baumback et al. |
| 8,775,553 B2 | 6/2014 | Cansino et al. |
| 8,782,207 B2 | 7/2014 | Qiu et al. |
| 8,782,236 B1 | 7/2014 | Marshall et al. |
| 8,782,279 B2 | 7/2014 | Eggleston et al. |
| 8,788,671 B2 | 7/2014 | Richardson et al. |
| 8,812,727 B1 | 8/2014 | Sorenson, III et al. |
| 8,819,187 B1 | 8/2014 | Hofmann |
| 8,819,283 B2 | 8/2014 | Richardson et al. |
| 8,826,032 B1 | 9/2014 | Yahalom et al. |
| 8,843,625 B2 | 9/2014 | Baumback et al. |
| 8,902,897 B2 | 9/2014 | Hamilton et al. |
| 8,904,009 B1 | 12/2014 | Marshall et al. |
| 8,914,514 B1 | 12/2014 | Jenkins et al. |
| 8,914,626 B1 | 12/2014 | Adogla et al. |
| 8,914,797 B2 | 12/2014 | Osogami et al. |
| 8,914,814 B1 | 12/2014 | Middleton et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 2/2015 | Borst et al. |
| 8,949,459 B1 | 2/2015 | Scholl |
| 8,966,318 B1 | 2/2015 | Shah |
| 8,971,328 B2 | 2/2015 | Judge et al. |
| 8,972,580 B2 | 3/2015 | Fleischman et al. |
| 8,976,711 B2 | 3/2015 | Li et al. |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,071,502 B2 | 5/2015 | Baumback et al. |
| 9,075,777 B1 | 7/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,088,460 B2 | 7/2015 | Baumback et al. |
| 9,106,701 B2 | 8/2015 | Richardson et al. |
| 9,116,803 B1 | 8/2015 | Agrawal et al. |
| 9,118,543 B2 | 8/2015 | Baumback et al. |
| 9,118,680 B1 | 8/2015 | Dunlap et al. |
| 9,130,756 B2 | 9/2015 | Richardson et al. |
| 9,130,977 B2 | 9/2015 | Zisapel et al. |
| 9,137,210 B2 | 9/2015 | Joglekar et al. |
| 9,137,301 B1 | 9/2015 | Dunlap et al. |
| 9,137,302 B1 | 9/2015 | Makhijani et al. |
| 9,154,551 B1 | 10/2015 | Watson |
| 9,160,641 B2 | 10/2015 | Baumback et al. |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,393 B2 | 11/2015 | Tovar |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,099 B2 | 12/2015 | Baumback et al. |
| 9,210,235 B2 | 12/2015 | Sivasubramanian et al. |
| 9,219,686 B2 | 12/2015 | Hilt et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,276,812 B1 | 3/2016 | Nagargadde et al. |
| 9,282,032 B2 | 3/2016 | Judge et al. |
| 9,294,391 B1 | 3/2016 | Mostert |
| 9,300,535 B2 | 3/2016 | Popli et al. |
| 9,323,577 B2 | 4/2016 | Marr et al. |
| 9,332,078 B2 | 5/2016 | Sivasubramanian et al. |
| 9,367,929 B2 | 5/2016 | Bettis et al. |
| 9,386,038 B2 | 7/2016 | Martini |
| 9,391,949 B1 | 7/2016 | Richardson et al. |
| 9,407,539 B1 | 8/2016 | Dickinson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,491,073 B2 | 10/2016 | Baumback et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,516,130 B1 * | 12/2016 | Graham-Cumming ..................... H04L 67/42 |
| 9,525,659 B1 | 12/2016 | Sonkin et al. |
| 9,544,388 B1 | 1/2017 | Li et al. |
| 9,544,394 B2 | 1/2017 | Richardson et al. |
| 9,571,389 B2 | 2/2017 | Richardson et al. |
| 9,575,810 B2 * | 2/2017 | Clarke ................. G06F 9/505 |
| 9,584,328 B1 | 2/2017 | Graham-Cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,403 B2 | 4/2017 | Baumback et al. |
| 9,628,509 B2 | 4/2017 | Holloway et al. |
| 9,628,554 B2 | 4/2017 | Marshall et al. |
| 9,645,808 B1 | 5/2017 | Turpie |
| 9,660,890 B2 | 5/2017 | Baumback et al. |
| 9,703,713 B2 | 7/2017 | Nadgowda |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,760,420 B1 | 9/2017 | Letz et al. |
| 9,769,248 B1 | 9/2017 | Krishnan et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 9,794,188 B2 | 10/2017 | Baumback et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 11/2017 | Arguelles et al. |
| 9,819,567 B1 | 11/2017 | Uppal et al. |
| 9,825,831 B2 | 11/2017 | Baumback et al. |
| 9,832,141 B1 | 11/2017 | Raftery |
| 9,871,794 B2 | 1/2018 | Joffe et al. |
| 9,887,914 B2 | 2/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 3/2018 | Richardson et al. |
| 9,929,959 B2 | 3/2018 | Mostert |
| 9,930,131 B2 | 3/2018 | MacCarthaigh et al. |
| 9,954,934 B2 | 4/2018 | Sivasubramanian et al. |

(56) References Cited

U.S. PATENT DOCUMENTS

| | | |
|---|---|---|
| 9,985,927 B2 | 5/2018 | Richardson et al. |
| 9,992,086 B1 | 6/2018 | Mizik et al. |
| 9,992,303 B2 | 6/2018 | Richardson et al. |
| 9,996,501 B1 | 6/2018 | Nelson et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,027,739 B1 | 7/2018 | Krishnan et al. |
| 10,033,627 B1 | 7/2018 | Howard et al. |
| 10,033,691 B1 | 7/2018 | Mizik et al. |
| 10,033,699 B2 | 7/2018 | Sullivan et al. |
| 10,049,051 B1 | 8/2018 | Baldwin |
| 10,063,459 B2 | 8/2018 | Judge et al. |
| 10,075,551 B1 | 9/2018 | Baldwin et al. |
| 10,079,742 B1 | 9/2018 | Richardson et al. |
| 10,091,096 B1 | 10/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,104,009 B2 | 10/2018 | Baumback et al. |
| 10,110,694 B1 | 10/2018 | Watson et al. |
| 10,116,584 B2 | 10/2018 | Richardson et al. |
| 10,135,620 B2 | 11/2018 | Richardson et al. |
| 10,148,542 B2 | 12/2018 | Baumback et al. |
| 10,157,135 B2 | 12/2018 | Richardson et al. |
| 10,158,729 B2 | 12/2018 | Sivasubramanian et al. |
| 10,162,753 B2 | 12/2018 | Marshall et al. |
| 10,180,993 B2 | 1/2019 | Raftery |
| 10,200,402 B2 | 2/2019 | Radlein et al. |
| 10,200,492 B2 | 2/2019 | MacCarthaigh et al. |
| 10,205,644 B2 | 2/2019 | Baumback et al. |
| 10,205,698 B1 | 2/2019 | Petersen et al. |
| 10,218,584 B2 | 2/2019 | Ellsworth et al. |
| 10,225,322 B2 | 3/2019 | Richardson et al. |
| 10,225,326 B1 | 3/2019 | Puchala et al. |
| 10,225,362 B2 | 3/2019 | Watson |
| 10,225,365 B1 | 3/2019 | Hotchkies et al. |
| 10,230,819 B2 | 3/2019 | Richardson et al. |
| 10,257,307 B1 | 4/2019 | Baldwin |
| 10,264,062 B2 | 4/2019 | Richardson et al. |
| 10,270,878 B1 | 4/2019 | Uppal et al. |
| 10,284,446 B2 | 5/2019 | Baumback et al. |
| 10,305,797 B2 | 5/2019 | Richardson et al. |
| 10,311,371 B1 | 6/2019 | Hotchkies et al. |
| 10,348,639 B2 | 7/2019 | Puchala et al. |
| 10,372,499 B1 | 8/2019 | Radhakrishnan et al. |
| 10,374,955 B2 | 8/2019 | Mostert |
| 10,410,085 B2 | 9/2019 | Bettis et al. |
| 10,447,648 B2 | 10/2019 | Bliss et al. |
| 10,462,025 B2 | 10/2019 | Baumback et al. |
| 10,467,042 B1 | 11/2019 | Mercier et al. |
| 10,469,355 B2 | 11/2019 | Uppal et al. |
| 10,469,513 B2 | 11/2019 | Uppal et al. |
| 10,491,534 B2 | 11/2019 | Richardson et al. |
| 10,505,961 B2 | 12/2019 | Uppal et al. |
| 10,506,029 B2 | 12/2019 | Hollis et al. |
| 10,511,567 B2 | 12/2019 | Richardson et al. |
| 10,516,590 B2 | 12/2019 | Mizik et al. |
| 10,521,348 B2 | 12/2019 | Marshall et al. |
| 10,523,783 B2 | 12/2019 | Richardson et al. |
| 10,530,874 B2 | 1/2020 | Sivasubramanian et al. |
| 10,542,079 B2 | 1/2020 | Marr et al. |
| 10,554,748 B2 | 2/2020 | Sivasubramanian et al. |
| 10,574,787 B2 | 2/2020 | Richardson et al. |
| 10,601,767 B2 | 3/2020 | Richardson et al. |
| 10,616,250 B2 | 4/2020 | Uppal et al. |
| 10,623,408 B2 | 4/2020 | Marshall et al. |
| 10,630,771 B1 | 4/2020 | Garza et al. |
| 10,645,149 B2 | 5/2020 | Sivasubramanian et al. |
| 10,666,756 B2 | 5/2020 | Baldwin et al. |
| 10,691,752 B2 | 6/2020 | Raftery |
| 10,742,550 B2 | 8/2020 | Richardson et al. |
| 10,742,593 B1 | 8/2020 | Vasquez et al. |
| 10,771,552 B2 | 9/2020 | Sivasubramanian et al. |
| 10,778,554 B2 | 9/2020 | Richardson et al. |
| 10,783,077 B2 | 9/2020 | Marshall et al. |
| 10,785,037 B2 | 9/2020 | Richardson et al. |
| 10,797,995 B2 | 10/2020 | Richardson et al. |
| 10,812,358 B2 | 10/2020 | Krishnan et al. |
| 10,831,549 B1 | 11/2020 | Radhakrishnan et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004816 A1 | 1/2002 | Vange et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0016831 A1 | 2/2002 | Peled et al. |
| 2002/0032777 A1* | 3/2002 | Kawata ............... H04L 67/1008 709/226 |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049842 A1 | 4/2002 | Huetsch et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0087797 A1 | 7/2002 | Adrangi |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0138761 A1 | 9/2002 | Kanemaki et al. |
| 2002/0143675 A1 | 10/2002 | Orshan |
| 2002/0143798 A1 | 10/2002 | Lisiecki et al. |
| 2002/0143984 A1* | 10/2002 | Hudson Michel ............... H04L 67/1095 709/238 |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |

(56) References Cited

U.S. PATENT DOCUMENTS

| | | |
|---|---|---|
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0187935 A1 | 12/2002 | Redmond et al. |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0206520 A1 | 11/2003 | Wu et al. |
| 2003/0221000 A1 | 11/2003 | Cherkasova et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan |
| 2004/0010621 A1 | 1/2004 | Afergan et al. |
| 2004/0010683 A1 | 1/2004 | Huitema |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0098478 A1 | 5/2004 | Koetke et al. |
| 2004/0105544 A1 | 6/2004 | Haneda et al. |
| 2004/0114579 A1 | 6/2004 | Karaoguz et al. |
| 2004/0117309 A1 | 6/2004 | Inoue et al. |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0170379 A1 | 9/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0205374 A1 | 10/2004 | Poletto et al. |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0260769 A1 | 12/2004 | Yamamoto |
| 2004/0267906 A1 | 12/2004 | Truty |
| 2004/0267907 A1 | 12/2004 | Gustafsson |
| 2005/0010653 A1 | 1/2005 | McCanne |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0039019 A1 | 2/2005 | Delany |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0149529 A1 | 7/2005 | Gutmans |
| 2005/0157712 A1 | 7/2005 | Rangarajan et al. |

(56) References Cited

U.S. PATENT DOCUMENTS

| | | |
|---|---|---|
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0174989 A1 | 8/2005 | Chen et al. |
| 2005/0181769 A1 | 8/2005 | Kogawa |
| 2005/0188073 A1 | 8/2005 | Nakamichi et al. |
| 2005/0192814 A1 | 8/2005 | Challener et al. |
| 2005/0192008 A1 | 9/2005 | Desai et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0201302 A1 | 9/2005 | Gaddis et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267928 A1 | 12/2005 | Anderson et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2005/0286564 A1 | 12/2005 | Hatley et al. |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 5/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |
| 2006/0143442 A1 | 6/2006 | Smith |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0221971 A1 | 9/2006 | Andrieux et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0242227 A1 | 10/2006 | Rao |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0055765 A1 | 3/2007 | Lisiecki et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0124309 A1 | 5/2007 | Takase et al. |
| 2007/0134641 A1 | 6/2007 | Lieu |
| 2007/0156726 A1 | 7/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |

(56) References Cited

U.S. PATENT DOCUMENTS

| | | |
|---|---|---|
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0214232 A1 | 9/2007 | Belimpasakis et al. |
| 2007/0219795 A1 | 9/2007 | Park et al. |
| 2007/0220010 A1 | 9/2007 | Ertugrul |
| 2007/0226294 A1 | 9/2007 | Pruitt et al. |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0233896 A1 | 10/2007 | Hilt et al. |
| 2007/0242824 A1 | 10/2007 | Vishik |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280197 A1 | 11/2007 | Pearlman et al. |
| 2007/0280229 A1 | 12/2007 | Kenney |
| 2007/0281689 A1 | 12/2007 | Altman et al. |
| 2007/0288588 A1 | 12/2007 | Wein et al. |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0028463 A1 | 1/2008 | Dagon et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 3/2008 | Eriksson et al. |
| 2008/0062997 A1 | 3/2008 | Nix |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0155694 A1 | 6/2008 | Kwon et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0184357 A1 | 7/2008 | Drako et al. |
| 2008/0189437 A1 | 8/2008 | Halley |
| 2008/0201332 A1 | 8/2008 | Souders et al. |
| 2008/0201401 A1 | 8/2008 | Pugh et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0222647 A1 | 9/2008 | Taylor et al. |
| 2008/0225779 A1 | 9/2008 | Bragiel et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288458 A1 | 11/2008 | Sun et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031042 A1 | 1/2009 | Phatak |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0083413 A1 | 3/2009 | Levow et al. |
| 2009/0086728 A1 | 4/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |

(56) References Cited

U.S. PATENT DOCUMENTS

| | | |
|---|---|---|
| 2009/0164614 A1 | 6/2009 | Christian et al. |
| 2009/0172167 A1 | 7/2009 | Drai et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 9/2009 | Trostle |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0254989 A1 | 10/2009 | Achan et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0265707 A1 | 10/2009 | Goodman et al. |
| 2009/0265786 A1 | 10/2009 | Xie et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0037314 A1 | 2/2010 | Perdisci et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0058352 A1 | 3/2010 | Esfahany et al. |
| 2010/0070603 A1 | 3/2010 | Moss et al. |
| 2010/0070700 A1 | 3/2010 | Borst et al. |
| 2010/0074268 A1 | 3/2010 | Raza |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0106934 A1 | 4/2010 | Calder et al. |
| 2010/0111059 A1 | 5/2010 | Beppu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161564 A1 | 6/2010 | Lee et al. |
| 2010/0161565 A1 | 6/2010 | Lee et al. |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0235915 A1 | 9/2010 | Memon et al. |
| 2010/0250710 A1 | 9/2010 | Cadwell et al. |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0262964 A1 | 10/2010 | Uyeda et al. |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 11/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2010/0332601 A1 | 12/2010 | Walter et al. |
| 2010/0332658 A1 | 12/2010 | Elyashev |
| 2011/0010244 A1 | 1/2011 | Hatridge |
| 2011/0016214 A1 | 1/2011 | Jackson |
| 2011/0029398 A1 | 2/2011 | Boudville |
| 2011/0029598 A1 | 2/2011 | Arnold et al. |
| 2011/0035469 A1 | 2/2011 | Smith et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0082916 A1 | 4/2011 | Swanson et al. |
| 2011/0085654 A1 | 4/2011 | Jana et al. |
| 2011/0087769 A1 | 4/2011 | Holmes et al. |
| 2011/0093584 A1 | 4/2011 | Qiu et al. |
| 2011/0096987 A1 | 4/2011 | Morales et al. |
| 2011/0099294 A1 | 4/2011 | Kapur et al. |
| 2011/0106949 A1 | 5/2011 | Patel et al. |
| 2011/0113467 A1 | 5/2011 | Agarwal et al. |
| 2011/0125894 A1 | 5/2011 | Anderson et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191446 A1 | 8/2011 | Dazzi et al. |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |

(56) References Cited

U.S. PATENT DOCUMENTS

| | | |
|---|---|---|
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0255445 A1 | 10/2011 | Johnson et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0296370 A1 | 12/2011 | Ferris et al. |
| 2011/0296473 A1 | 12/2011 | Babic |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0014249 A1 | 1/2012 | Mao et al. |
| 2012/0023090 A1 | 1/2012 | Holloway et al. |
| 2012/0023226 A1 | 1/2012 | Petersen et al. |
| 2012/0031626 A1 | 2/2012 | Clayton et al. |
| 2012/0036238 A1 | 2/2012 | Sundaram et al. |
| 2012/0041899 A1 | 2/2012 | Greene et al. |
| 2012/0041970 A1 | 2/2012 | Ghosh et al. |
| 2012/0042381 A1 | 2/2012 | Antonakakis et al. |
| 2012/0054860 A1 | 2/2012 | Wyschogrod et al. |
| 2012/0066360 A1 | 3/2012 | Ghosh |
| 2012/0072600 A1 | 3/2012 | Richardson et al. |
| 2012/0072608 A1 | 3/2012 | Peters et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089700 A1 | 4/2012 | Safruti et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 5/2012 | Abramoff et al. |
| 2012/0117621 A1 | 5/2012 | Kondamuru et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 6/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0204176 A1 | 8/2012 | Tian et al. |
| 2012/0209942 A1 | 8/2012 | Zehavi et al. |
| 2012/0224516 A1 | 9/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 10/2012 | Kim et al. |
| 2012/0257628 A1 | 10/2012 | Bu et al. |
| 2012/0259954 A1 | 10/2012 | McCarthy et al. |
| 2012/0272224 A1 | 10/2012 | Brackman |
| 2012/0278229 A1 | 11/2012 | Vishwanathan et al. |
| 2012/0278831 A1 | 11/2012 | van Coppenolle et al. |
| 2012/0278833 A1 | 11/2012 | Tam |
| 2012/0297009 A1 | 11/2012 | Amir et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0317573 A1 | 12/2012 | Osogami et al. |
| 2012/0324089 A1 | 12/2012 | Joshi |
| 2013/0003547 A1 | 1/2013 | Motwani et al. |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0013764 A1 | 1/2013 | Li et al. |
| 2013/0018945 A1 | 1/2013 | Vendrow et al. |
| 2013/0019311 A1 | 1/2013 | Swildens et al. |
| 2013/0034099 A1 | 2/2013 | Hikichi et al. |
| 2013/0036307 A1 | 2/2013 | Gagliano et al. |
| 2013/0041872 A1 | 2/2013 | Aizman et al. |
| 2013/0042328 A1 | 2/2013 | Padinjareveetil |
| 2013/0046869 A1 | 2/2013 | Jenkins et al. |
| 2013/0046883 A1 | 2/2013 | Lientz et al. |
| 2013/0054675 A1 | 2/2013 | Jenkins et al. |
| 2013/0055374 A1 | 2/2013 | Kustarz et al. |
| 2013/0061306 A1 | 3/2013 | Sinn |
| 2013/0067530 A1 | 3/2013 | Spektor et al. |
| 2013/0073808 A1 | 3/2013 | Puthalath et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0084898 A1 | 4/2013 | Li et al. |
| 2013/0086001 A1 | 4/2013 | Bhogal et al. |
| 2013/0089005 A1 | 4/2013 | Li et al. |
| 2013/0111035 A1 | 5/2013 | Alapati et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0254879 A1 | 9/2013 | Chesla et al. |
| 2013/0263256 A1 | 10/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0283266 A1 | 10/2013 | Baset et al. |
| 2013/0305046 A1 | 11/2013 | Mankovski et al. |
| 2013/0305083 A1 | 11/2013 | Machida |
| 2013/0311555 A1 | 11/2013 | Laoutaris et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0339429 A1 | 12/2013 | Richardson et al. |
| 2013/0346465 A1 | 12/2013 | Maltz et al. |
| 2013/0346470 A1 | 12/2013 | Obstfeld et al. |
| 2013/0346567 A1 | 12/2013 | Richardson et al. |
| 2013/0346614 A1 | 12/2013 | Baughman et al. |
| 2014/0006465 A1 | 1/2014 | Davis et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0036675 A1 | 2/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059198 A1 | 2/2014 | Richardson et al. |
| 2014/0059208 A1 | 2/2014 | Yan et al. |
| 2014/0059379 A1 | 2/2014 | Ren et al. |
| 2014/0082165 A1 | 3/2014 | Marr et al. |
| 2014/0082614 A1 | 3/2014 | Klein et al. |

(56) References Cited

U.S. PATENT DOCUMENTS

| | | |
|---|---|---|
| 2014/0089917 A1 | 3/2014 | Attalla et al. |
| 2014/0108474 A1 | 4/2014 | David et al. |
| 2014/0108672 A1 | 4/2014 | Ou et al. |
| 2014/0119194 A1 | 5/2014 | Raciborski et al. |
| 2014/0122698 A1 | 5/2014 | Batrouni et al. |
| 2014/0122725 A1 | 5/2014 | Batrouni et al. |
| 2014/0137111 A1 | 5/2014 | Dees, Jr. et al. |
| 2014/0143305 A1 | 5/2014 | Choi et al. |
| 2014/0149601 A1 | 5/2014 | Carney et al. |
| 2014/0164817 A1 | 6/2014 | Bartholomy et al. |
| 2014/0165061 A1 | 6/2014 | Greene et al. |
| 2014/0181268 A1 | 6/2014 | Stevens et al. |
| 2014/0195686 A1 | 7/2014 | Yeager et al. |
| 2014/0200036 A1 | 7/2014 | Egner et al. |
| 2014/0215019 A1 | 7/2014 | Ahrens |
| 2014/0244937 A1 | 8/2014 | Bloomstein et al. |
| 2014/0258523 A1 | 9/2014 | Kazerani et al. |
| 2014/0269371 A1 | 9/2014 | Badea et al. |
| 2014/0279852 A1 | 9/2014 | Chen |
| 2014/0280606 A1 | 9/2014 | Long |
| 2014/0280679 A1 | 9/2014 | Dey et al. |
| 2014/0297866 A1 | 10/2014 | Ennaji et al. |
| 2014/0297870 A1 | 10/2014 | Eggleston et al. |
| 2014/0298021 A1 | 10/2014 | Kwon et al. |
| 2014/0310402 A1 | 10/2014 | Giaretta et al. |
| 2014/0310811 A1 | 10/2014 | Hentunen |
| 2014/0324774 A1 | 10/2014 | Chen et al. |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0351413 A1 | 11/2014 | Smith et al. |
| 2014/0351871 A1 | 11/2014 | Bomfim et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 3/2015 | Yum |
| 2015/0074228 A1 | 3/2015 | Drake |
| 2015/0081877 A1 | 3/2015 | Sethi et al. |
| 2015/0088586 A1 | 3/2015 | Pavlas et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0095516 A1 | 3/2015 | Bergman |
| 2015/0106864 A1 | 4/2015 | Li et al. |
| 2015/0149600 A1 | 5/2015 | Thibeault et al. |
| 2015/0149631 A1 | 5/2015 | Lissack |
| 2015/0154051 A1 | 6/2015 | Kruglick |
| 2015/0156172 A1 | 6/2015 | Nandi et al. |
| 2015/0156279 A1 | 6/2015 | Vaswani et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180995 A1 | 6/2015 | Hofmann |
| 2015/0188734 A1 | 7/2015 | Petrov |
| 2015/0189042 A1 | 7/2015 | Sun et al. |
| 2015/0195244 A1 | 7/2015 | Richardson et al. |
| 2015/0200991 A1 | 7/2015 | Kwon |
| 2015/0207733 A1 | 7/2015 | Richardson et al. |
| 2015/0215388 A1 | 7/2015 | Kontothanassis et al. |
| 2015/0215656 A1 | 7/2015 | Pulung et al. |
| 2015/0229710 A1 | 8/2015 | Sivasubramanian et al. |
| 2015/0242397 A1 | 8/2015 | Zhuang |
| 2015/0244580 A1 | 8/2015 | Saavedra |
| 2015/0256647 A1 | 9/2015 | Richardson et al. |
| 2015/0271031 A1 | 9/2015 | Beevers |
| 2015/0288647 A1 | 10/2015 | Chhabra et al. |
| 2015/0317118 A1 | 11/2015 | Orikasa et al. |
| 2015/0319260 A1 | 11/2015 | Watson |
| 2015/0339136 A1 | 11/2015 | Suryanarayanan et al. |
| 2015/0341431 A1 | 11/2015 | Hartrick et al. |
| 2015/0358276 A1 | 12/2015 | Liu et al. |
| 2015/0358436 A1 | 12/2015 | Kim et al. |
| 2015/0363113 A1 | 12/2015 | Rahman et al. |
| 2015/0363282 A1 | 12/2015 | Rangasamy |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028598 A1 | 1/2016 | Khakpour et al. |
| 2016/0028755 A1 | 1/2016 | Vasseur et al. |
| 2016/0036857 A1 | 2/2016 | Foxhoven et al. |
| 2016/0041910 A1 | 2/2016 | Richardson et al. |
| 2016/0065475 A1 | 2/2016 | Hilt et al. |
| 2016/0065665 A1 | 3/2016 | Richardson et al. |
| 2016/0072669 A1 | 3/2016 | Saavedra |
| 2016/0072720 A1 | 3/2016 | Richardson et al. |
| 2016/0104346 A1 | 3/2016 | Ovalle et al. |
| 2016/0132600 A1 | 5/2016 | Woodhead et al. |
| 2016/0134492 A1 | 5/2016 | Ellsworth et al. |
| 2016/0142251 A1 | 5/2016 | Contreras et al. |
| 2016/0164761 A1 | 6/2016 | Sathyanarayana et al. |
| 2016/0164799 A1 | 6/2016 | Popli et al. |
| 2016/0182454 A1 | 6/2016 | Phonsa et al. |
| 2016/0182542 A1 | 6/2016 | Staniford |
| 2016/0205062 A1 | 7/2016 | Mosert |
| 2016/0226895 A1* | 8/2016 | Huang ............... H04L 63/1416 |
| 2016/0241637 A1 | 8/2016 | Marr et al. |
| 2016/0241639 A1 | 8/2016 | Brookins et al. |
| 2016/0253262 A1 | 9/2016 | Nadgowda |
| 2016/0255042 A1 | 9/2016 | Newton |
| 2016/0269927 A1 | 9/2016 | Kim et al. |
| 2016/0274929 A1 | 9/2016 | King |
| 2016/0294678 A1 | 10/2016 | Khakpour et al. |
| 2016/0308959 A1 | 10/2016 | Richardson et al. |
| 2016/0337426 A1 | 11/2016 | Shribman et al. |
| 2016/0366202 A1 | 12/2016 | Phillips et al. |
| 2016/0373789 A1 | 12/2016 | Tsukagoshi |
| 2017/0041428 A1 | 2/2017 | Katsev |
| 2017/0099254 A1 | 4/2017 | Leach et al. |
| 2017/0099345 A1 | 4/2017 | Leach |
| 2017/0109316 A1 | 4/2017 | Hack et al. |
| 2017/0126557 A1 | 5/2017 | Richardson et al. |
| 2017/0126796 A1 | 5/2017 | Hollis et al. |
| 2017/0142062 A1 | 5/2017 | Richardson et al. |
| 2017/0153980 A1 | 6/2017 | Araújo et al. |
| 2017/0155678 A1 | 6/2017 | Araújo et al. |
| 2017/0155732 A1 | 6/2017 | Araùjo et al. |
| 2017/0163425 A1 | 6/2017 | Kaliski, Jr. |
| 2017/0170973 A1 | 6/2017 | Gill et al. |
| 2017/0171146 A1 | 6/2017 | Sharma et al. |
| 2017/0180217 A1 | 6/2017 | Puchala et al. |
| 2017/0180267 A1 | 6/2017 | Puchala et al. |
| 2017/0214755 A1 | 7/2017 | Sivasubramanian et al. |
| 2017/0214761 A1 | 7/2017 | Hsu et al. |
| 2017/0250821 A1 | 8/2017 | Richardson et al. |
| 2017/0257340 A1 | 9/2017 | Richardson et al. |
| 2017/0262373 A1* | 9/2017 | Bedi ................... G06F 16/9574 |
| 2017/0353395 A1 | 12/2017 | Richardson et al. |
| 2017/0374121 A1 | 12/2017 | Phillips et al. |
| 2018/0011913 A1 | 1/2018 | Kapanipathi et al. |
| 2018/0027040 A1 | 1/2018 | Bae |
| 2018/0063027 A1 | 3/2018 | Rafferty |
| 2018/0063193 A1 | 3/2018 | Chandrashekhar et al. |
| 2018/0077109 A1 | 3/2018 | Hoeme et al. |
| 2018/0077110 A1 | 3/2018 | Huston, III et al. |
| 2018/0097631 A1 | 4/2018 | Uppal et al. |
| 2018/0097634 A1 | 4/2018 | Uppal et al. |
| 2018/0097831 A1 | 4/2018 | Uppal et al. |
| 2018/0109553 A1 | 4/2018 | Radlein et al. |
| 2018/0159757 A1 | 6/2018 | Uppal et al. |
| 2018/0159769 A1 | 6/2018 | Richardson et al. |
| 2018/0167444 A1 | 6/2018 | Sivasubramanian et al. |
| 2018/0167469 A1 | 6/2018 | Sivasubramanian et al. |
| 2018/0173526 A1 | 6/2018 | Prinsloo et al. |
| 2018/0176615 A1 | 6/2018 | Hannu et al. |
| 2018/0183689 A1 | 6/2018 | Ellsworth et al. |
| 2018/0191817 A1 | 7/2018 | Richardson et al. |
| 2018/0212880 A1 | 7/2018 | Mostert |
| 2018/0213052 A1 | 7/2018 | Maccarthaigh et al. |
| 2018/0278717 A1 | 9/2018 | Richardson et al. |
| 2018/0287916 A1 | 10/2018 | Mizik et al. |
| 2018/0302322 A1 | 10/2018 | Richardson et al. |
| 2018/0332107 A1 | 11/2018 | Marr et al. |
| 2018/0337885 A1 | 11/2018 | Singh et al. |

(56) References Cited

U.S. PATENT DOCUMENTS

| | | |
|---|---|---|
| 2018/0351904 A1 | 12/2018 | Mizik et al. |
| 2018/0367498 A1 | 12/2018 | Bliss et al. |
| 2019/0007515 A1 | 1/2019 | Baldwin et al. |
| 2019/0020562 A1 | 1/2019 | Richardson et al. |
| 2019/0028562 A1 | 1/2019 | Watson et al. |
| 2019/0044787 A1 | 2/2019 | Richardson et al. |
| 2019/0044846 A1 | 2/2019 | Howard et al. |
| 2019/0073303 A1 | 2/2019 | Marshall et al. |
| 2019/0089542 A1 | 3/2019 | Richardson et al. |
| 2019/0089818 A1 | 3/2019 | Choi |
| 2019/0098109 A1 | 3/2019 | Watson |
| 2019/0121739 A1 | 4/2019 | Richardson et al. |
| 2019/0129908 A1 | 4/2019 | Kumarasamy |
| 2019/0140922 A1 | 5/2019 | Ellsworth et al. |
| 2019/0173941 A1 | 5/2019 | Puchala et al. |
| 2019/0173972 A1 | 6/2019 | MacCarthaigh et al. |
| 2019/0190998 A1 | 6/2019 | Sivasubramanian et al. |
| 2019/0222666 A1 | 6/2019 | Uppal et al. |
| 2019/0268265 A1 | 7/2019 | Richardson et al. |
| 2019/0297137 A1 | 9/2019 | Richardson et al. |
| 2019/0327510 A1 | 10/2019 | Kalagi et al. |
| 2019/0354484 A1 | 11/2019 | Marshall et al. |
| 2020/0065132 A1 | 2/2020 | Mercier et al. |
| 2020/0084268 A1 | 3/2020 | Hollis et al. |
| 2020/0195677 A1 | 6/2020 | Uppal et al. |
| 2020/0195753 A1 | 6/2020 | Richardson et al. |
| 2020/0265096 A1 | 8/2020 | Raftery |
| 2020/0287817 A1 | 9/2020 | Howard et al. |
| 2020/0366638 A1 | 11/2020 | Vasquez et al. |
| 2020/0389534 A1 | 12/2020 | Sivasubramanian et al. |
| 2020/0389541 A1 | 12/2020 | Baldwin et al. |

FOREIGN PATENT DOCUMENTS

| | | | |
|---|---|---|---|
| CN | 1422468 A | 6/2003 | |
| CN | 1511399 A | 7/2004 | |
| CN | 1605182 A | 4/2005 | |
| CN | 101189598 A | 5/2008 | |
| CN | 101431539 A | 5/2009 | |
| CN | 101460907 A | 6/2009 | |
| CN | 101631133 A | 1/2010 | |
| CN | 103731481 A | 4/2014 | |
| EP | 1603307 A2 | 12/2005 | |
| EP | 1351141 A2 | 10/2007 | |
| EP | 2008167 A2 | 12/2008 | |
| EP | 3156911 A1 | 4/2017 | |
| GB | 2243052 A * | 10/1991 | H04L 49/25 |
| JP | 07-141305 | 6/1995 | |
| JP | 2001-0506093 | 5/2001 | |
| JP | 2001-249907 | 9/2001 | |
| JP | 2002-024192 | 1/2002 | |
| JP | 2002-044137 | 2/2002 | |
| JP | 2002-323986 | 11/2002 | |
| JP | 2003-167810 A | 6/2003 | |
| JP | 2003-167813 A | 6/2003 | |
| JP | 2003-188901 A | 7/2003 | |
| JP | 2003-522358 A | 7/2003 | |
| JP | 2004-070935 | 3/2004 | |
| JP | 2004-532471 | 10/2004 | |
| JP | 2004-533738 A | 11/2004 | |
| JP | 2005-537687 | 12/2005 | |
| JP | 3748216 B2 | 2/2006 | |
| JP | 2007-133896 A | 5/2007 | |
| JP | 2007-207225 A | 8/2007 | |
| JP | 2008-515106 A | 5/2008 | |
| JP | 2009-071538 A | 4/2009 | |
| JP | 2012-509623 | 4/2012 | |
| JP | 2012-209623 | 10/2012 | |
| WO | WO 2001/045349 A2 | 6/2001 | |
| WO | WO 2002/069608 A2 | 9/2002 | |
| WO | WO 2005/071560 A1 | 8/2005 | |
| WO | WO 2007/007960 A1 | 1/2007 | |
| WO | WO 2007/126837 A2 | 11/2007 | |
| WO | WO 2009124006 A2 | 10/2009 | |
| WO | WO 2010/002603 A1 | 1/2010 | |
| WO | WO 2012/044587 | 4/2012 | |
| WO | WO 2012065641 A1 | 5/2012 | |
| WO | WO 2014/047073 A1 | 3/2014 | |
| WO | WO 2017/106455 A1 | 6/2017 | |
| WO | WO 2018/236597 A1 | 12/2018 | |

OTHER PUBLICATIONS

JH Software, Moving a DNS Server to a New IP Address, last updated Jan. 26, 2006, 1 page.
Office Action in European Application No. 11767118.0 dated Jul. 25, 2018.
Extended Search Report in European Application No. 18156163 dated Sep. 3, 2018.
Office Action in Chinese Application No. 2013800492635 dated Aug. 30, 2017.
Office Action in Application No. 09729072.0 dated May 14, 2018.
Examination Report in Indian Application No. 6213/CHENP/2010 dated May 23, 2018.
International Preliminary Report on Patentability in PCT/US/2016/066848 dated Jun. 19, 2018.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdeliverynetwork&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.

(56) References Cited

OTHER PUBLICATIONS

"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login:;37-39, Nov. 1999, http://www.cs.columbia.edu/-smb/papers/distfw.html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, in Proc. of Networking 2005, all pages.
Gunther et al, "Measuring Round Trip Times to determine the Distance between WLAN Nodes", Dec. 18, 2004, Technical University Berlin, all pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables _ Basics.html, 4 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1," Jul. 30, 2003, CNet News.com, retrieved May 3, 2006, http://news.zdnet.com/2100-3513_22-5057752.html, 8 pages.
Sharif et al, "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21(2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.

(56) References Cited

OTHER PUBLICATIONS

Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.

(56) References Cited

OTHER PUBLICATIONS

Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
Arends et al., DNS Security Introduction and Requirements, RFC 4033, Mar. 2005, 21 pages.
Ariyapperuma et al., "Security Vulnerabilities in DNS and DNSSEC." The Second International Conference on Availability, Reliability and Security, IEEE, 2007, 8 pages.
Chandramouli et al., "Challenges in Securing the Domain Name System." IEEE Security & Privacy4.1 (2006),pp. 84-87.
Eastlake, Donald, Domain Name System Security Extensions, RFC 2535, Mar. 1999, 47 pages.
Office Action in Application No. 09729072.0 dated Dec. 7, 2018.
Examination Report in Indian Application No. 4487/DELNP/2013 dated Dec. 28, 2018.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, p. 202-211.
Office Action in Indian Application No. 5937/CHENP/2010 dated Jan. 19, 2018.
Office Action in Indian Application No. 6210/CHENP/2010 dated Mar. 27, 2018.
Office Action in Chinese Application No. 201310537815.9 dated Feb. 1, 2018.
Office Action in European Application No. 07754164.7 dated Jan. 25, 2018.
International Search Report and Written Opinion in PCT/US2017/055156 dated Dec. 13, 2017.
Zaman et al., "Combinatorial Auction-Based Dynamic VM Provisioning and Allocation in Clouds", Department of Computer Science, Wayne State University, Sep. 2011 http://www.cs.wayne.edu/-dgrosu/pub/ccgrid12-symp.pdf.
Office Action in European Application No. 11767118.0 dated Jan. 29, 2019.
Examination Report in Indian Application No. 3105/DELNP/2013, dated Feb. 19, 2019.
Office Action in European Application No. 13770602.4 dated Mar. 11, 2019.
Extended European Search Report in Application No. 16876655.8 dated Aug. 20, 2019.
Frangoudis et al., "PTPv2-based network load estimation and its application to QoE monitoring for Over-the-Top services", IEEE, The 5th International conference on Information, Intelligence, Systems and Applications, IISA 2014, XP032629858, Jul. 7, 2014, pp. 176-181.
Office Action in Indian Application No. 2823/DELNP/2015 dated Oct. 25, 2019.
Partial Search Report in European Application No. 16876655.8 May 15, 2019.
International Preliminary Report on Patentability and Written Opinion in PCT/US2017/055156 dated Apr. 9, 2019.
International Search Report and Written Opinion in PCT/US2018/036634 dated Sep. 11, 2018.
Partial Search Report in European Application No. 16876655.8 dated May 15, 2019.
Extended Search Report in European Applicaton No. 19184826.6 dated Jan. 17, 2020.
International Preliminary Report on Patentability and Written Opinion in PCT/US2018/036634 dated Dec. 24, 2019.
Office Action in Brazilian Application No. BR112015005588-5 dated Jan. 14, 2020.
Office Action in Chinese Application No. 201810426428.0 dated Jul. 20, 2020 in 25 pages.
Second Office Action in Chinese Application No. 201610828846.3 dated Aug. 5, 2020.
Office Action issued in connection with European Patent Application No. 18734734 dated Oct. 19, 2020.

\* cited by examiner

LOAD ESTIMATING CONTENT DELIVERY NETWORK

BACKGROUND

Some content providers attempt to facilitate the delivery of requested content, such as network pages (e.g., content pages, Web pages, etc.) and/or resources identified in network pages, through the utilization of a network storage provider or a content delivery network ("CDN") service provider. A network storage provider and a CDN server provider each typically maintain a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
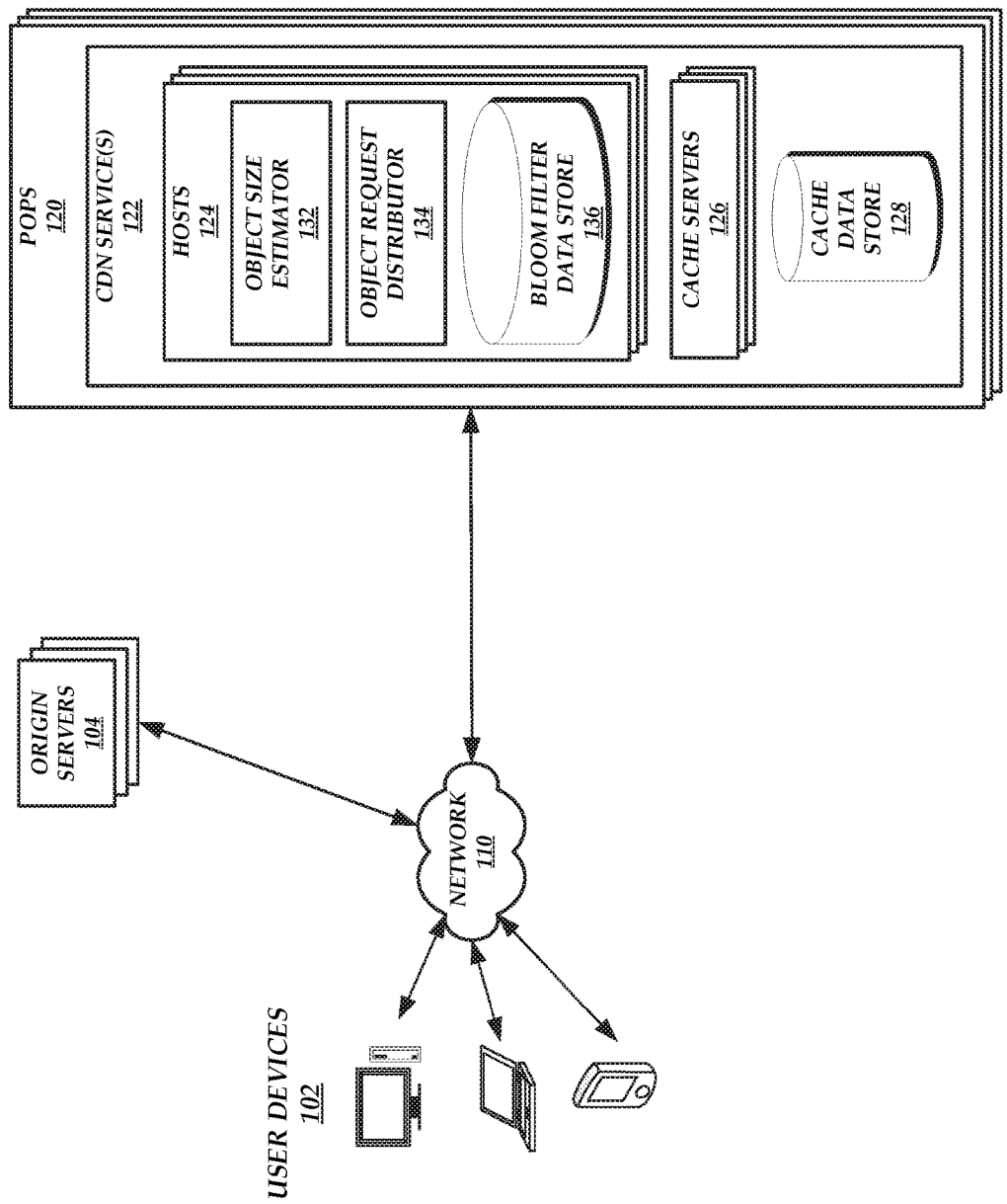
FIG. 1 is a block diagram of an illustrative operating environment in which a plurality of POPs may each implement a load estimating CDN service.

Generally described, aspects of the present disclosure relate to a content delivery network ("CDN") that estimates a size of a requested content resource (e.g., a data object, such as a video file, an audio file, a script, an image, a document, etc.) for use in implementing load balancing techniques. The load balancing techniques implemented by the CDN may reduce a latency of a delivery of the requested content resource.

As referenced above, CDNs may receive a high volume of content resource requests. Typically, CDNs employ load balancers to balance the incoming request load onto a number of cache servers. For example, typical CDNs may use consistent hashing techniques to distribute content resource requests onto different cache servers such that the cache servers each serve a similar number of requests.

For a CDN, however, all content resource requests are not equal. The computing resources (e.g., disk space, processor time, central processing power, graphical processing power, memory, network bandwidth, internal bus utilization, etc.) required by a CDN to serve one request can be drastically different from the computing resources required by the CDN to serve another request. For example, in typical scenarios, a 100 KB data object requested by a user device can be served by the CDN faster than a 20 GB data object. Typical load balancers do not take into account the size of a requested data object in determining how to balance the incoming request load because the size of the requested data object is unknown until the requested data object is delivered by the CDN to the user device. For example, the data object request may identify the desired data object, but the data object request may not indicate a size of the desired data object. Thus, typical load balancers do not fully evaluate the computing resource cost that may be incurred by a received data object request. The absence of a full evaluation of the computing resource cost that may be incurred by a received data object request can lead to imbalances on the cache servers. For example, some cache servers may be tasked with processing a higher load than other cache servers, even if the number of requests being served by each cache server is similar.

One possible solution for overcoming the deficiencies described above is to implement a CDN that stores the size of a data object a first time a request for the data object is received. The next time a request for the data object is received, the CDN can then retrieve the size and employ load balancers to balance the incoming load request according to the retrieved size. However, a CDN may receive thousands of requests per second. In addition, certain CDNs may be multitenant CDNs (e.g., CDNs that serve requests for data objects originating from different content providers), meaning that the CDNs receive requests for a large diversity of data objects. The amount of memory required to store information identifying the size of each requested data object and/or associated information (e.g., a cache key associated with each requested data object) may be too large for a CDN to handle.

Thus, a more efficient and less computing resource intensive approach may be to store an approximate history of data object requests and corresponding sizes. Accordingly, aspects of the present disclosure provide a CDN that employs a load balancer that uses probabilistic filters (e.g., Bloom filters, Cuckoo filters, etc.) to estimate sizes of requested data objects and that balances incoming request loads according to the estimated sizes. For example, the load balancer may store one or more probabilistic filters. Each probabilistic filter may be associated with a size range (e.g., a minimum data object size and a maximum data object size). The probabilistic filters in the aggregate (referred to herein as a "probabilistic filter family") may cover a range of possible data object sizes. As an illustrative example, a first probabilistic filter may be associated with a size range of 0 KB to 100 KB, a second probabilistic filter may be associated with a size range of 101 KB to 1 MB, a third probabilistic filter may be associated with a size range of 1.001 MB to 10 MB, and so on. The size range associated with a probabilistic filter may be defined such that an amount of CDN computing resources necessary to serve a request for a data object with a size within the size range is similar to an amount of CDN computing resources necessary to serve a request for another data object with a different size within the size range (e.g., the difference in the amount of CDN computing resources necessary for serving a request for a data object with a minimum size within the size range and for serving a request for a data object with a maximum size within the size range is less than a threshold value; the difference in latency for serving a request for a data object with a minimum size within the size range and for serving a request for a data object with a maximum size within the size range is less than a threshold value, such as 10 ms or a time that would not be noticeable to a user; etc.).

When a CDN receives a request for a particular data object, a load balancer can generate a cache key based on the request, generate a hash (or multiple different hashes) based on the cache key, and use the hash(es) to determine within a certain probability whether the cache key is a member of any of the probabilistic filters. If the load balancer determines that the cache key is a member of a probabilistic filter, then the load balancer can determine an estimated size of the data object associated with the cache key based on the probabilistic filter of which the cache key is a member. For example, the load balancer can estimate that the data object size is a size that corresponds with the size range associated with the probabilistic filter of which the cache key is a member (e.g., the load balancer can estimate that the data object size is a maximum size of the size range associated with the probabilistic filter of which the cache key is a member). The load balancer may then use the estimated size to estimate the added load on one or more cache servers. Based on the estimated added load, the load balancer can select a cache server to handle the request. The load balancer can then transmit the cache key to the selected cache server such that the selected cache server serves the data object corresponding to the cache key to the requesting device.

If, however, the load balancer determines that the cache key is not a member of any probabilistic filter, then the load balancer may assign a size to the data object associated with the cache key. For example, the load balancer may assign a random size to the data object; may assign a size to the data object selected using consistent hashing techniques; may assign a size to the data object based on an overall average of sizes corresponding to requested data objects; may assign a size to the data object based on properties of the data object request, such as a distribution (e.g., a hostname), a URL type (e.g., a video URL, an audio URL, etc.), and/or a range header (e.g., a number of bytes indicated in the header); and/or the like. The load balancer may use the assigned size to estimate the added load on one or more cache servers, select a cache server to handle the request based on the estimated added load, and transmit the cache key to the selected cache server such that the selected cache server serves the data object corresponding to the cache key to the requesting device.

Once the request is served, the actual size of the data object may be known. The load balancer can then add the cache key to the probabilistic filter that is associated with a size range within which the data object size falls. Thus, because a representation of a data object is added as a member of a probabilistic filter once the actual data object size is known and because each probabilistic filter is associated with a size range, the probabilistic filter family can store data that represents an approximate or partial history of received data object requests and corresponding sizes (e.g., the history of received data object requests is approximate or partial because the load balancer is not tracking the receipt of a data object request if a request for the same data object has previously been received). As described in greater detail below, the probabilistic filters can be reset periodically to reduce the CDN memory usage and/or to minimize false positives (e.g., situations in which the load balancer determines that data representing a data object is a member of a probabilistic filter when in fact the data representing the data object is not a member of that probabilistic filter).

In some instances, a CDN may operate as a distributed system in which multiple points of presence (POPs) implement instances of the CDN. As used herein, a POP is intended to refer to any collection of related computing devices utilized to implement functionality on behalf of one or many providers. POPs are generally associated with a specific geographic location in which the computing devices implementing the POP are located, or with a region serviced by the POP. For example, a data center or a collection of computing devices within a data center may form a POP. A CDN may utilize multiple POPs that are geographically diverse, to enable users in a variety of geographic locations to quickly transmit and receive information (e.g., requested data objects) from the CDN. In some instances, the POPs may also implement other services in addition to the CDN services, such as data storage services, data processing services, etc.

For simplicity, the present disclosure is described herein with respect to a specific type of probabilistic filter—a Bloom filter. However, this is not meant to be limiting. For example, the functionality of the Bloom filters described herein may be implemented using other types of probabilistic filters (e.g., Cuckoo filters).

By using probabilistic filters to estimate the size of a requested data object, the CDN described herein may more effectively balance the load on the cache servers as compared with typical CDNs. Cache servers with more balanced loads may lead to a reduction in the latency associated with the delivery of a requested data object when compared with the performance of typical CDNs. The foregoing aspects and many of the attendant advantages of this disclosure will become more readily appreciated as the same become better understood by reference to the following detailed description, when taken in conjunction with the accompanying drawings.

Example Load Estimating CDN Environment

FIG. 1 is a block diagram of an illustrative operating environment 100 in which a plurality of POPs 120 may each implement a load estimating CDN service 122. The CDN service 122 may further implement one or more hosts 124, one or more cache servers 126, and a cache data store 128. Various user devices 102 may communicate with the POPs 120 via a network 110 to request data objects.

While the user devices 102 and POPs 120 are shown as grouped within FIG. 1, the user devices 102 and POPs 120 may be geographically distant, and independently owned or operated. For example, the user devices 102 could represent a multitude of users in various global, continental, or regional locations accessing the POPs 120. Further, the POPs 120 may be globally, continentally, or regionally disparate, in order to provide a wide geographical presence for the CDN services 122. Accordingly, the groupings of user devices 102 and POPs 120 within FIG. 1 is intended to represent a logical, rather than physical, grouping.

The operating environment 100 further includes one or more origin servers 104. The origin servers 104 may include any computing device owned or operated by an entity that has provided one or more sets of content ("distributions") to a CDN (e.g., CDN service 122) for subsequent transmission to user devices 102. For example, origin servers 104 may include servers hosting web sites, streaming audio, video, or multimedia services, data analytics services, or other network-accessible services. The origin servers 104 may include primary versions of content within various distributions. The primary versions of content may be retrieved by the various POPs 120 for subsequent transmission to the user devices 102. In an embodiment, the POPs 120 includes a cache that stores frequently-requested content (e.g., the cache data store 128). If requested content is not present in the POP 120 cache, then the POP 120 may retrieve the content from an origin server 104. In alternate embodiments, not shown, the POP 120 may first request the content from an intermediate cache housed within a regional data center. If the requested content is also not present in the intermediate cache, then the POP 120 may retrieve the content from an origin server 104.

Users, by way of user devices 102, may interact with a host 124 of a CDN service 122 of a POP 120 to request content (e.g., a data object). In an embodiment, each host 124 functions as a load balancer. In particular, each host 124 may select a cache server 126 to deliver the requested data object based on an analysis of the load being handled by the cache servers 126 and an estimated size of the requested data object. A single POP 120 may include multiple hosts 124 such that the POP 120 can service multiple data object requests simultaneously.

For example, each host 124 may include an object size estimator 132, an object request distributor 134, and a Bloom filter data store 136. The object size estimator 132 may receive the data object request from a user device 102. The data object request may include header information (e.g., Hypertext Transfer Protocol (HTTP) header information) and a URL that identifies a location of the data object (e.g., in an origin server 104). The object size estimator 132 can generate a cache key corresponding to the request using the header information, the URL, and/or other user-defined information (e.g., generate a hash using this information). Various cache keys may be stored in the cache data store 128 in association with corresponding data objects (e.g., a cache key may be stored in the cache data store 128 in association with a data object that corresponds to the request from which the cache key is generated). Thus, the generated cache key can be used by a cache server 126 to retrieve a data object from the cache data store 128 (e.g., the data object requested by the user device 102).

The object size estimator 132 may also use the generated cache key to estimate a data object size. For example, the Bloom filter data store 136 may store one or more Bloom filters. Each Bloom filter may be represented as an N-bit array. Each Bloom filter may also be associated with one or more hash functions. The hash functions associated with a Bloom filter can be non-cryptographic hash functions (e.g., Fowler-Noll-Vo (FNV), Murmurhash, etc.) and/or a cryptographic hash functions (e.g., MD5, SHA-256, etc.). When a Bloom filter is created or reset, each bit in the N-bit array may be a logical "0." As described herein, cache keys may be added as members of a Bloom filter, which may result in one or more bits in the N-bit array becoming a logical "1." To test whether a cache key is a member of a Bloom filter, the object size estimator 132 applies each hash function associated with the Bloom filter to the cache key. In other words, the object size estimator 132 generates a first hash of the cache key using a first hash function associated with the Bloom filter, generates a second hash of the cache key using a second hash function associated with the Bloom filter, and so on until hashes of the cache key are generated using each hash function associated with the Bloom filter. The hash values that result from applying the hash functions to the cache key may each be alphanumeric values that correspond to an element in the N-bit array. As an illustrative example, a first hash of the cache key may be the value "2" and a second hash of the cache key may be the value "14." Thus, the first hash may correspond to the second element in the N-bit array and the second hash may correspond to the fourteenth element in the N-bit array. After applying each hash function associated with the Bloom filter to the cache key, the object size estimator 132 determines whether each element in the N-bit array that corresponds to a generated hash value is a logical "1." If each element in the N-bit array that corresponds to a generated hash value is a logical "1," then the object size estimator 132 determines that the cache key is a member of the Bloom filter. Otherwise, if one or more elements in the N-bit array that correspond to a generated hash value are a logical "0," then the object size estimator 132 determines that the cache key is not a member of the Bloom filter.

The object size estimator 132 can use a determination of a cache key being a member of a Bloom filter as an indicator of a possible size of a data object associated with the cache key. For example, each Bloom filter stored in the Bloom filter data store 136 is associated with a size range (e.g., a minimum size and a maximum size). The Bloom filters in the aggregate (referred to herein as a "Bloom filter family") therefore may cover a large range of possible data object sizes. Because each Bloom filter is associated with a size range, a cache key is added as a member of a particular Bloom filter if a size of the data object associated with the cache key falls within the size range associated with the particular Bloom filter. Thus, cache keys that are members of a Bloom filter are each associated with a data object that has a size that falls within the size range associated with the Bloom filter. Accordingly, if the object size estimator 132 determines that a cache key is a member of a first Bloom filter, then the data object associated with the cache key likely has a size that falls within the size range associated with the first Bloom filter.

Once the cache key is generated using the data object request, the object size estimator 132 begins the process for estimating the data object size by first retrieving one or more of the Bloom filters stored in the Bloom filter data store 136. For a first Bloom filter, the object size estimator 132 can apply each hash function associated with the first Bloom filter to the generated cache key. The object size estimator 132 can then identify the element(s) that correspond to the resulting hash value(s) and analyze the first Bloom filter to determine whether the first Bloom filter is represented by an N-bit array that has a logical "1" stored in each of the identified element(s). The object size estimator 132 can repeat this process to test cache key membership in each of the retrieved Bloom filters or just until the object size estimator 132 identifies a Bloom filter of which the generated cache key is a member.

In some embodiments, each Bloom filter stored in the Bloom filter data store 136 is associated with the same set of hash functions (e.g., a Bloom filter family is associated with the same set of hash functions). Thus, the object size estimator 132 may apply each associated hash function to the cache key once. The object size estimator 132 can then retrieve one or more of the Bloom filters stored in the Bloom filter data store 136, identify the element(s) that correspond to the resulting hash value(s), and analyze the Bloom filters to determine whether any Bloom filter is represented by an N-bit array that has a logical "1" stored in each of the identified element(s). By having each Bloom filter in the Bloom filter data store 136 being associated with the same set of hash functions, the object size estimator 132 may test for membership in the Bloom filters using fewer computing resources.

If the object size estimator 132 determines that the generated cache key is a member of a particular Bloom filter, then the object size estimator 132 estimates that the data object associated with the generated cache key has a size corresponding to the size range of the Bloom filter of which the generated cache key is a member. For example, the object size estimator 132 may estimate the size of the data object to be the maximum size in the size range, the minimum size in the size range, an average size in the size range, and/or the like. Once the object size estimator 132 estimates the data object size, the object size estimator 132 can inform the object request distributor 134 of the estimated size.

On the other hand, if the object size estimator 132 determines that the generated cache key is not a member of any retrieved Bloom filter, then the object size estimator 132 can assign a size to the data object associated with the generated cache key. For example, the object size estimator 132 may assign a random size to the data object; may assign a size to the data object selected using consistent hashing techniques (e.g., one of a set of sizes is assigned based on a hash value generated using consistent hashing techniques (e.g., the generated hash value rotates between a set of hash values each time a hash is performed, and each hash value in the set is associated with a size)); may assign a size to the data object based on an overall average of sizes corresponding to requested data objects; may assign a size to the data object based on properties of the data object request, such as a distribution (e.g., a hostname), a URL type (e.g., a video URL, an audio URL, etc.), and/or a range header (e.g., a number of bytes indicated in the header); and/or the like. The object size estimator 132 can inform the object request distributor 134 of the assigned size and/or indicate that the assigned size is not an estimate based on Bloom filter membership. Alternatively, the object size estimator 132 may assign no size to the data object and may inform the object request distributor 134 that no size has been assigned to the data object.

In some situations, the object size estimator 132 may determine that the generated cache key is a member of two or more Bloom filters. For example, this situation may occur due to a false positive test result. In such a situation, the object size estimator 132 may estimate that the size of the data object associated with the generated cache key is a value derived from one or more size ranges associated with the Bloom filters of which the generated cache key is determined to be a member. For example, the object size estimator 132 may determine which Bloom filter is associated with a higher size range and estimate that the size of the data object associated with the generated cache key is a size within the higher size range (e.g., the maximum size of the higher size range). As another example, the object size estimator 132 may estimate that the size of the data object associated with the generated cache key is an average of the size ranges associated with the Bloom filters of which the generated cache key is determined to be a member.

The object request distributor 134 may select a cache server 126 to serve the requested data object using the data provided by the object size estimator 132 and/or cache server 126 load information. For example, the object request distributor 134 may track a current load on each of the cache servers 126. The current load may be represented by a value that is an aggregate of the estimated sizes of the data objects being served by a cache server 126 at a particular point in time. When a cache server 126 is tasked with responding to a new data object request, the object request distributor 134 may increase the value representing the current load of the cache server 126 by the estimated size of the requested data object (e.g., as estimated by the object size estimator 132) or by the size assigned to the requested data object (e.g., if the generated cache key was not a member of any Bloom filter). Likewise, once the cache server 126 is finished delivering a requested data object, the object request distributor 134 may decrease the value representing the current load of the cache server 126 by the estimated size of the requested data object (e.g., as estimated by the object size estimator 132) or by the size assigned to the requested data object (e.g., if the generated cache key was not a member of any Bloom filter).

The object request distributor 134 may aim to maintain similar loads on each of the cache servers 126. Thus, the object request distributor 134 may use the estimated or assigned size provided by the object size estimator 132 to identify a cache server 126 that has capacity to handle the data object request given current load levels. For example, the object request distributor 134 can calculate an average current load of the cache servers 126. The object request distributor 134 can then identify any cache servers 126 that have a current load below the calculated average and that, if tasked with handling the data object request, would still have a current load less than or equal to the calculated average given the estimated or assigned size. The object request distributor 134 may then select one of these identified cache servers 126 to service the data object request. As another example, the object request distributor 134 can add the estimated or assigned size to the current load of each cache server 126 and identify one or more cache servers 126 that have a current load such that the addition of the estimated or assigned size would still result in the current load of all cache servers 126 being within a threshold value of each other (e.g., within 10 MB of each other, within 10% of each other, etc.). As another example, the object request distributor 134 can add the estimated or assigned size to the current load of each cache server 126 and identify one or more cache servers 126 that have a current load such that the addition of the estimated or assigned size would still result in the current load of the respective cache server 126 being below the capacity and/or safety threshold of the respective cache servers 126 (even if the current load of the respective cache server 126 exceeds a calculated average current load, for example, because it may be more likely that the respective cache server 126 has access to the data object). The object request distributor 134 may then select one of these identified cache servers 126 to service the data object request.

Selection of a cache server 126 to service the data object request may cause the object request distributor 134 to update the current load of the selected cache server 126. For example, the object request distributor 134 may add the estimated or assigned size to the current load of the selected cache server 126 to form an updated version of the current load. The object request distributor 134 may then store the updated version of the current load of the selected cache server 126 for future use.

A data store (not shown) that stores the current loads of the cache servers 126 may be stored internal to the object request distributor 134. Alternatively, the data store (not shown) that stores the current loads of the cache servers 126 may be stored external to the object request distributor 134 (e.g., in a host 124 or in the CDN service 122 and/or cache server 126 such that the data store is available to all hosts 124). Thus, the object request distributor 134 may retrieve the current load information for each of the cache servers 126 from the external data store, perform the analysis of and/or update to the current load information as described above, and re-store in the external data store the possibly updated current load information of each cache server 126 once the cache server 126 selection is complete.

Once a cache server 126 is selected, the object request distributor 134 may instruct the selected cache server 126 to service the data object request by providing the generated cache key to the selected cache server 126. The selected cache server 126 may then query the cache data store 128 using the generated cache key, receive the data object corresponding to the generated cache key from the cache data store 128 in response to the query, and the transmit the received data object to the user device 102 to satisfy the data object request. If the query does not result in the selected cache server 126 receiving a data object (e.g., because the data object is not stored in the cache data store 128), then the selected cache server 126 may retrieve the data object from an origin server 104 (e.g., using the URL in the data object request) and/or instruct an origin server 104 to transmit the corresponding data object to the user device 102 (e.g., by providing the URL in the data object request) to satisfy the data object request.

If the object size estimator 132 initially determined that the generated cache key was not a member of any Bloom filter, then the object size estimator 132 can add the generated cache key to the appropriate Bloom filter for use in future requests. For example, the actual size of the data object may be known before, during, and/or after the selected cache server 126 delivers the data object to the user device 102. The selected cache server 126 may therefore transmit a message to the object size estimator 132 indicating the actual data object size once the actual data object size is known. The object size estimator 132 may then identify the Bloom filter stored in the Bloom filter data store 136 that is associated with a size range in which the actual data object size falls. Once the appropriate Bloom filter is identified, the object size estimator 132 can determine the hash functions associated with the identified Bloom filter. The object size estimator 132 can then apply each hash function associated with the identified Bloom filter to the previously generated cache key (e.g., the cache key generated based on the contents of the data object request). The object size estimator 132 adds the generated cache key as a member of the identified Bloom filter by identifying each element in the N-bit array representing the identified Bloom filter that corresponds to a generated hash value and changing the bit in those elements to be a logical "1."

If the object size estimator 132 initially determined that the generated cache key was not a member of any Bloom filter, then the selected cache server 126 may also transmit the actual data object size to the object request distributor 134. The object request distributor 134 can use the actual data object size to update the current load of the selected cache server 126, if necessary. For example, if the assigned size differs from the actual data object size to the extent that the assigned size falls within the size range associated with one Bloom filter and the actual data object size falls within the size range associated with a different Bloom filter, then the object request distributor 134 can subtract the assigned size from the current load and add the actual data object size. The object request distributor 134 may subsequently subtract the actual data object size from the current load once the data object is delivered by the selected cache server 126 to the user device 102.

As described herein, each POP 120 is a collection of related computing devices utilized to implement CDN functionality on behalf of one or many providers. For example, the hosts 124, the one or more cache servers 126, and/or the cache data store 128 may each be implemented by one or more related computing devices (e.g., devices that include one or more processors, memory, input/output interfaces, networking interfaces, etc. to implement the functionality described herein). Each POP 120 may be generally associated with a specific geographic location in which the computing devices implementing the respective POP 120 are located, or with a region serviced by the respective POP 120. For example, a data center or a collection of computing devices within a data center may form a POP 120. A CDN may utilize multiple POPs 120 that are geographically diverse, to enable users in a variety of geographic locations to quickly transmit and receive information (e.g., requested data objects) from the CDN. In some instances, the POPs 120 may also implement other services in addition to the CDN services 122, such as data storage services, data processing services, etc.

The CDN services 122 may operate in a distributed computing environment including several computer systems that are interconnected using one or more computer networks (not shown in FIG. 1). The CDN services 122 could also operate within a computing environment having a fewer or greater number of devices than are illustrated in FIG. 1. For example, the CDN services 122 are depicted as including one or more cache servers 126 and a cache data store 128, but the one or more cache servers 126 and/or the cache data store 128 may be implemented by computing devices located external to the POPs 120. Thus, the depiction of the CDN services 122 in FIG. 1 should be taken as illustrative and not limiting to the present disclosure. For example, the CDN services 122 or various constituents thereof could implement various Web services components, hosted or "cloud" computing environments, and/or peer to peer network configurations to implement at least a portion of the processes described herein. Further, the CDN services 122 may be implemented directly in hardware or software executed by hardware devices and may, for instance, include one or more physical or virtual servers implemented on physical computer hardware configured to execute computer executable instructions for performing various features that are described herein.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser) that submits requests for data objects to the POPs 120 when, for example, a user attempts to view a network page (e.g., a content page, a Web page, etc.).

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagrams for Load Balancing

Figure 2:
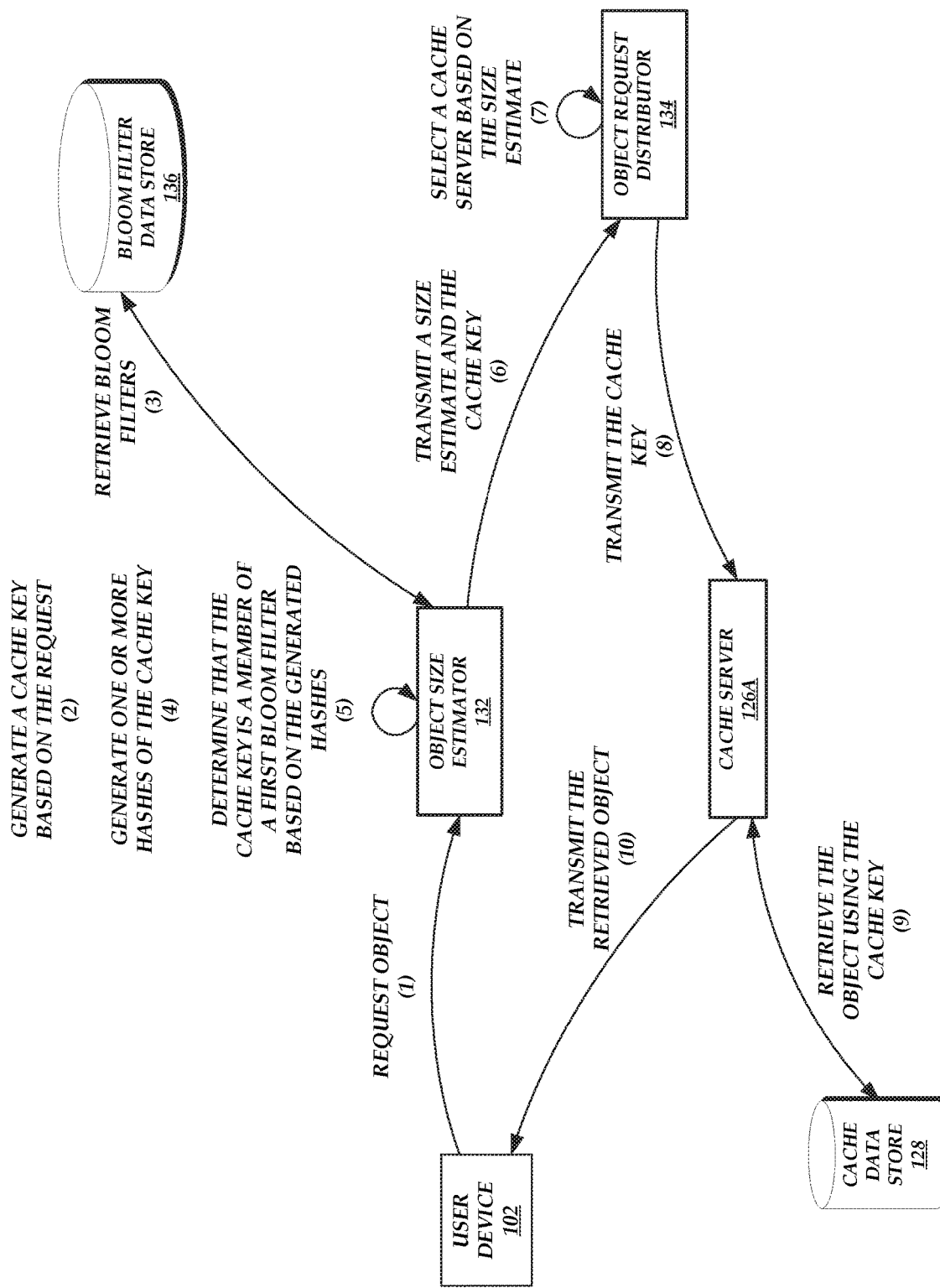
FIG. 2 is a block diagram of the operating environment of FIG. 1 illustrating the operations performed by the components of the operating environment to load balance using estimated data object sizes, according to one embodiment.

FIG. 2 is a block diagram of the operating environment 100 of FIG. 1 illustrating the operations performed by the components of the operating environment 100 to load balance using estimated data object sizes, according to one embodiment. As illustrated in FIG. 2, the user device 102 transmits a request for a data object to the object size estimator 132 at (1). The request may include header information and a URL corresponding to a data object.

The object size estimator 132 generates a cache key based on the request at (2). The object size estimator 132 may then retrieve one or more Bloom filters from the Bloom filter data store 136 at (3). For example, the Bloom filter data store 136 may store a Bloom filter family and the object size estimator 132 may retrieve each Bloom filter in the Bloom filter family.

Each retrieved Bloom filter may be associated with one or more hash functions that are used to add members and/or test membership in the respective Bloom filter. Thus, the object size estimator 132 can generate one or more hashes of the cache key at (4) for the purpose of identifying whether the cache key is a member of any of the retrieved Bloom filters. For example, the object size estimator 132 can generate, for each hash function associated with each Bloom filter, a hash of the cache key using the respective hash function.

The object size estimator 132 can then use the generated hashes to determine whether the cache key is a member of any of the retrieved Bloom filters. For example, for each retrieved Bloom filter, the object size estimator 132 can identify the elements of the N-bit array representing the respective Bloom filter that correspond with the hashes generated using the hash functions associated with the respective Bloom filter. If the identified elements all have bits set to logical "1," then the object size estimator 132 determines that the cache key is a member of the respective Bloom filter. Otherwise, if any of the identified elements have a bit set to logical "0," then the object size estimator 132 determines that the cache key is not a member of the respective Bloom filter. In the depicted example, the object size estimator 132 determines at (5) that the cache key is a member of a first Bloom filter based on one or more of the generated hashes.

As described herein, the Bloom filters within the Bloom filter family may all be associated with the same set of hash functions. Thus, the object size estimator 132 may generate a single set of hash values using the associated hash functions. The object size estimator 132 can then use the single set of hash values to evaluate each retrieved Bloom filter for the purpose of determining whether the cache key is a member of any retrieved Bloom filter.

Once the object size estimator 132 determines that the cache key is a member of the first Bloom filter, the object size estimator 132 estimates that the data object corresponding to the cache key has a size corresponding to the size range associated with the first Bloom filter. For example, the object size estimator 132 may estimate that the data object corresponding to the cache key has a size equal to the maximum size in the size range associated with the first Bloom filter. The object size estimator 132 can then transmit the size estimate and/or the cache key to the object request distributor 134 at (6).

The object request distributor 134 can retrieve data (e.g., from a data store, not shown) identifying a current load on one or more of the cache servers 126. The object request distributor 134 can then use the size estimate to estimate the added load on one or more of the cache servers 126 for the purpose of selecting one cache server 126 to service the data object request. For example, the object request distributor 134 can calculate an average current load of the cache servers 126. The object request distributor 134 can then identify any cache servers 126 that have a current load below the calculated average and that, if tasked with handling the data object request, would still have a current load less than or equal to the calculated average given the size estimate. The object request distributor 134 may then select one of these identified cache servers 126 to service the data object request. As another example, the object request distributor 134 can add the size estimate to the current load of each cache server 126 and identify one or more cache servers 126 that have a current load such that the addition of the size estimate would still result in the current load of all cache servers 126 being within a threshold value of each other (e.g., within 10 MB of each other, within 10% of each other, etc.). The object request distributor 134 may then select one of these identified cache servers 126 to service the data object request. Thus, the object request distributor 134 selects a cache server 126A to service the data object request based on the size estimate at (7).

The object request distributor 134 can then transmit the cache key to the selected cache server 126A at (8). The cache server 126A may retrieve the data object from the cache data store 128 using the cache key at (9). In alternate embodiments, not shown, the cache data store 128 does not include the data object. Thus, the cache server 126A may retrieve the data object from an origin server 104. Once the cache server 126A retrieves the data object, the cache server 126A transmits the retrieved data object to the user device 102 at (10) to satisfy the data object request.

Figure 3:
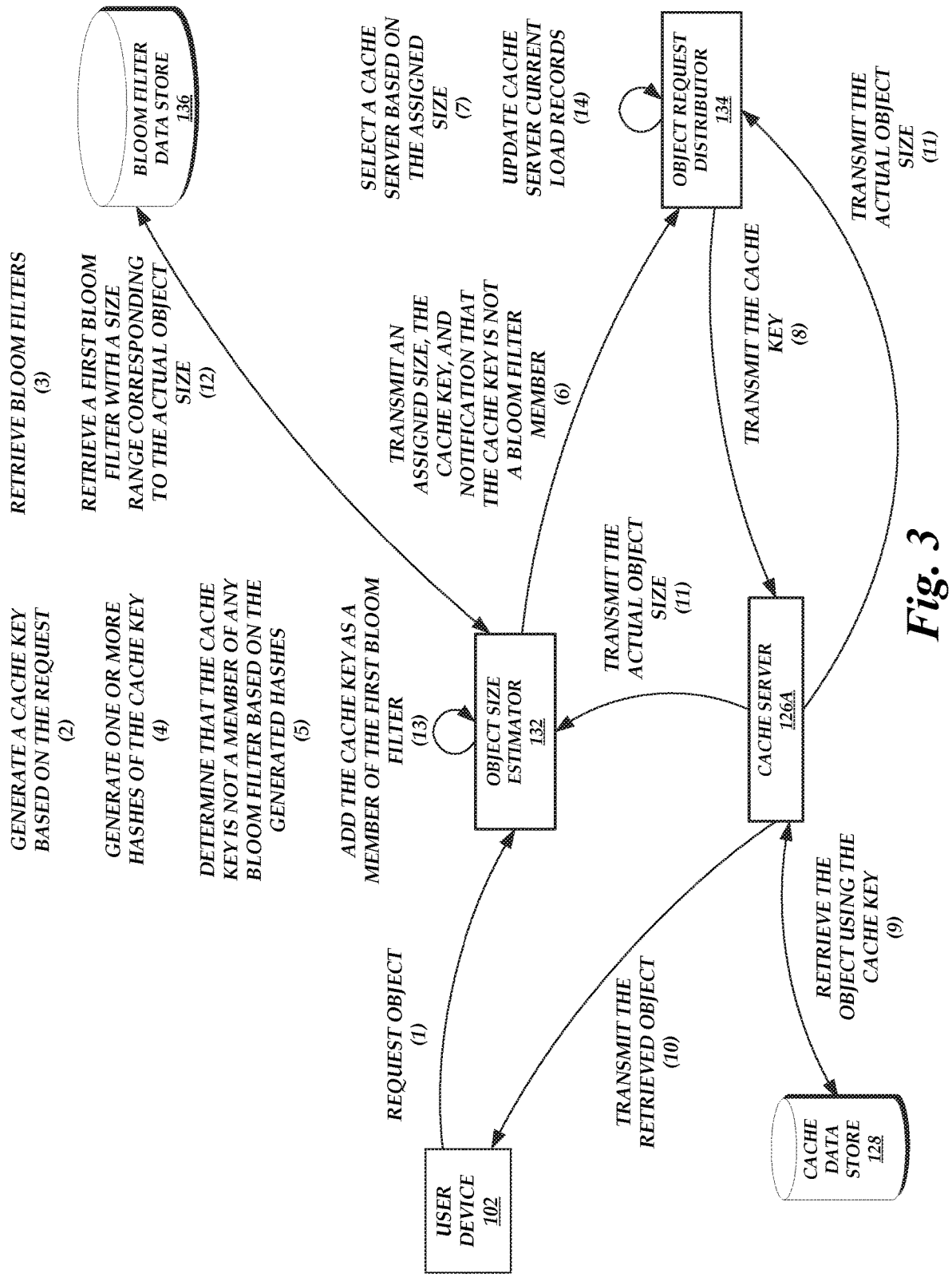
FIG. 3 is another block diagram of the operating environment of FIG. 1 illustrating the operations performed by the components of the operating environment to load balance using estimated data object sizes, according to one embodiment.

FIG. 3 is another block diagram of the operating environment 100 of FIG. 1 illustrating the operations performed by the components of the operating environment 100 to load balance using estimated data object sizes, according to one embodiment. As illustrated in FIG. 3, the user device 102 transmits a request for a data object to the object size estimator 132 at (1). The request may include header information and a URL corresponding to a data object.

The object size estimator 132 generates a cache key based on the request at (2). The object size estimator 132 may then retrieve one or more Bloom filters from the Bloom filter data store 136 at (3). For example, the Bloom filter data store 136 may store a Bloom filter family and the object size estimator 132 may retrieve each Bloom filter in the Bloom filter family.

Each retrieved Bloom filter may be associated with one or more hash functions that are used to add members and/or test membership in the respective Bloom filter. Thus, the object size estimator 132 can generate one or more hashes of the cache key at (4) for the purpose of identifying whether the cache key is a member of any of the retrieved Bloom filters. For example, the object size estimator 132 can generate, for each hash function associated with each Bloom filter, a hash of the cache key using the respective hash function.

The object size estimator 132 can then use the generated hashes to determine whether the cache key is a member of any of the retrieved Bloom filters. For example, for each retrieved Bloom filter, the object size estimator 132 can identify the elements of the N-bit array representing the respective Bloom filter that correspond with the hashes generated using the hash functions associated with the respective Bloom filter. If the identified elements all have bits set to logical "1," then the object size estimator 132 determines that the cache key is a member of the respective Bloom filter. Otherwise, if any of the identified elements have a bit set to logical "0," then the object size estimator 132 determines that the cache key is not a member of the respective Bloom filter. In the depicted example, the object size estimator 132 determines at (5) that the cache key is not a member of any retrieved Bloom filter based on one or more of the generated hashes.

As described herein, the Bloom filters within the Bloom filter family may all be associated with the same set of hash functions. Thus, the object size estimator 132 may generate a single set of hash values using the associated hash functions. The object size estimator 132 can then use the single set of hash values to evaluate each retrieved Bloom filter for the purpose of determining whether the cache key is a member of any retrieved Bloom filter.

Once the object size estimator 132 determines that the cache key is not a member of any retrieved Bloom filter, the object size estimator 132 assigns a size to the data object. For example, the object size estimator 132 may assign a random size to the data object; may assign a size to the data object selected using consistent hashing techniques (e.g., one of a set of sizes is assigned based on a hash generated using consistent hashing techniques); may assign a size to the data object based on an overall average of sizes corresponding to requested data objects; may assign a size to the data object based on properties of the data object request, such as a distribution (e.g., a hostname), a URL type (e.g., a video URL, an audio URL, etc.), and/or a range header (e.g., a number of bytes indicated in the header); and/or the like. Alternatively, not shown, the object size estimator 132 may assign no size to the data object. The object size estimator 132 can then transmit the assigned size, the cache key, and/or a notification that the cache key is not a member of any retrieved Bloom filter to the object request distributor 134 at (6).

The object request distributor 134 can retrieve data (e.g., from a data store, not shown) identifying a current load on one or more of the cache servers 126. The object request distributor 134 can then use the assigned size to estimate the added load on one or more of the cache servers 126 for the purpose of selecting one cache server 126 to service the data object request. For example, the object request distributor 134 can calculate an average current load of the cache servers 126. The object request distributor 134 can then identify any cache servers 126 that have a current load below the calculated average and that, if tasked with handling the data object request, would still have a current load less than or equal to the calculated average given the assigned size. The object request distributor 134 may then select one of these identified cache servers 126 to service the data object request. As another example, the object request distributor 134 can add the assigned size to the current load of each cache server 126 and identify one or more cache servers 126 that have a current load such that the addition of the assigned size would still result in the current load of all cache servers 126 being within a threshold value of each other (e.g., within 10 MB of each other, within 10% of each other, etc.). The object request distributor 134 may then select one of these identified cache servers 126 to service the data object request. Thus, the object request distributor 134 selects a cache server 126A to service the data object request based on the assigned size at (7).

The object request distributor 134 can then transmit the cache key to the selected cache server 126A at (8). The cache server 126A may retrieve the data object from the cache data store 128 using the cache key at (9). In alternate embodiments, not shown, the cache data store 128 does not include the data object. Thus, the cache server 126A may retrieve the data object from an origin server 104. Once the cache server 126A retrieves the data object, the cache server 126A transmits the retrieved data object to the user device 102 at (10) to satisfy the data object request.

Before, during, and/or after transmission of the data object to the user device 102, the actual data object size may become known. Thus, the cache server 126A can transmit the actual data object size to the object size estimator 132 and/or the object request distributor 134 at (11). The object size estimator 132 can identify that a first Bloom filter is associated with a size range in which the actual data object size falls and retrieve, from the Bloom filter data store 136, the first Bloom filter at (12) in response to this identification. The object size estimator 132 can then add the cache key as a member of the first Bloom filter using the techniques described herein at (13) such that future requests for the data object may result in the object size estimator 132 determining that a generated cache key is a member of the first Bloom filter. The object request distributor 134 may update the cache server 126A current load records, if necessary, at (14) using the actual data object size in a manner as described herein.

While steps (11) through (14) are depicted in FIG. 3 as occurring after step (10), this is not meant to be limiting. For example, the object size estimator 132 may add the cache key as a member of the first Bloom filter and/or the object request distributor 134 may update the cache server 126A current load records before the cache server 126A transmits the data object to the user device 102.

Example Load Balancing Routine

Figure 4:
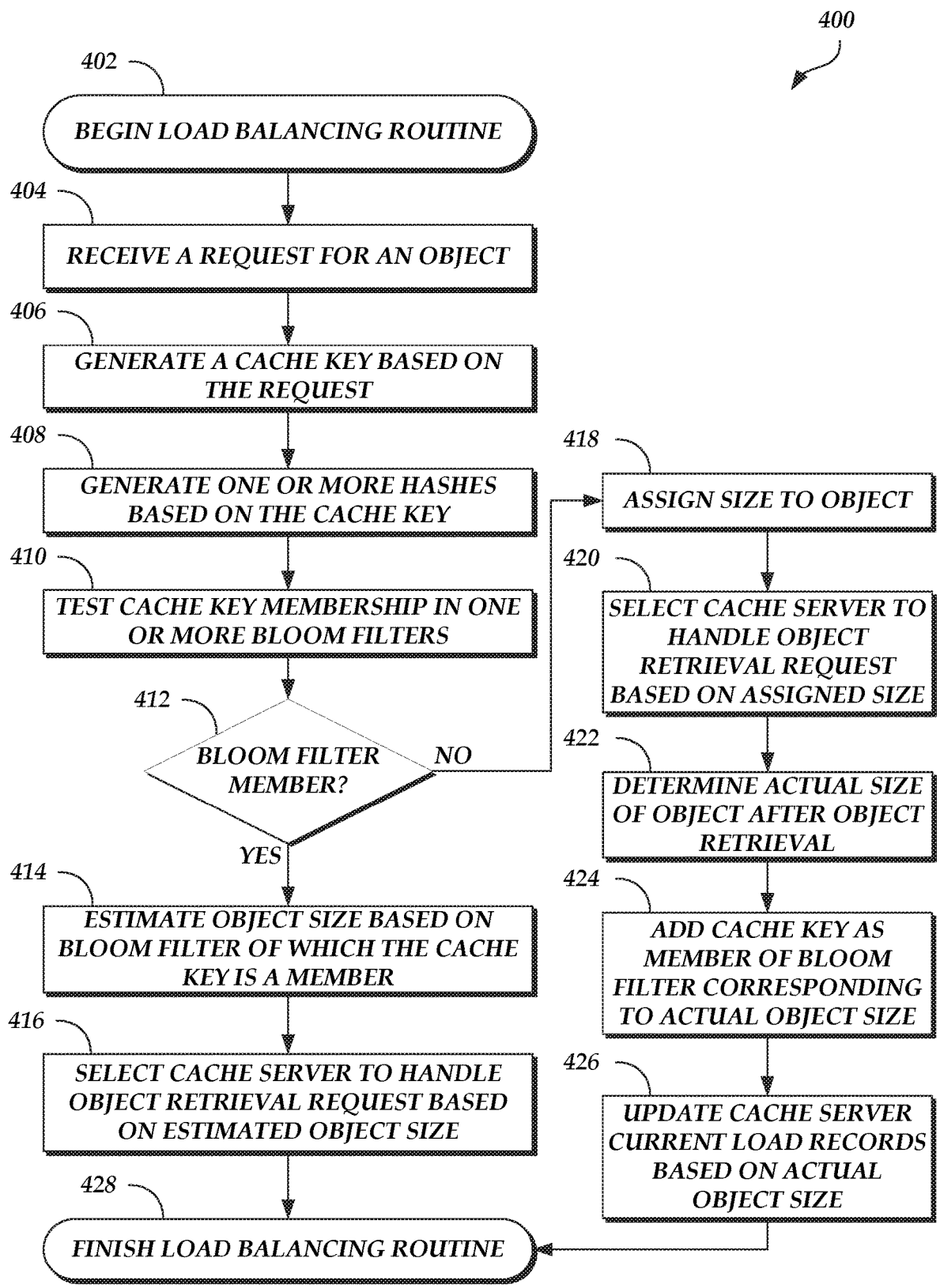
FIG. 4 is a flow diagram depicting a load balancing routine illustratively implemented by a POP, according to one embodiment.

FIG. 4 is a flow diagram depicting a load balancing routine 400 illustratively implemented by a POP, according to one embodiment. As an example, the POP 120 (e.g., the CDN service 122) of FIG. 1 can be configured to execute the load balancing routine 400. The load balancing routine 400 begins at block 402.

At block 404, a request for a data object is received. The request may include header information and/or a URL identifying a location of a data object.

At block 406, a cache key is generated based on the request. For example, the cache key may be generated based on the header information and/or the URL (e.g., the cache key may be a hash of the header information and/or the URL).

At block 408, one or more hashes are generated based on the cache key. For example, a different hash may be generated for each hash function associated with one or more Bloom filters using the respective hash function.

At block 410, cache key membership in one or more Bloom filters is tested. For example, the generated hash(es) may each identify an element in an N-bit array, where each Bloom filter is represented by a different N-bit array. For each Bloom filter, if the identified elements in the N-bit array representing the respective Bloom filter each have a bit set to logical "1," then the cache key is a member of the respective Bloom filter. Otherwise, if any identified element in the N-bit array representing the respective Bloom filter has a bit set to logical "0," then the cache key is not a member of the respective Bloom filter.

At block 412, a determination is made as to whether the cache key is a member of any Bloom filter. If the cache key is a member of a Bloom filter according to the test operation described herein, then the load balancing routine 400 proceeds to block 414. Otherwise, if the cache key is not a member of any Bloom filter according to the test operation described herein, then the load balancing routine 400 proceeds to block 418.

At block 414, an object size is estimated based on the Bloom filter of which the cache key is a member. For example, the Bloom filter of which the cache key is a member is associated with a size range. The object corresponding to the cache key can be estimated to have a size that is the maximum size in the size range, the minimum size in the size range, the average size in the size range, and/or another size within the size range.

At block 416, a cache server is selected to handle the object retrieval request based on the estimated object size. For example, the current load of one or more cache servers 126 can be retrieved. A cache server 126 can be selected to handle the object retrieval request based on the current load level of the cache server 126 and/or current load levels of other cache servers 126. For example, the object request distributor 134 can calculate an average current load of the cache servers 126. The object request distributor 134 can then identify any cache servers 126 that have a current load below the calculated average and that, if tasked with handling the data object request, would still have a current load less than or equal to the calculated average given the estimated object size. The object request distributor 134 may then select one of these identified cache servers 126 to handle the object retrieval request. As another example, the object request distributor 134 can add the estimated object size to the current load of each cache server 126 and identify one or more cache servers 126 that have a current load such that the addition of the estimated object size would still result in the current load of all cache servers 126 being within a threshold value of each other (e.g., within 10 MB of each other, within 10% of each other, etc.). After the cache server is selected, the load balancing routine 400 ends, as shown at block 428.

At block 418, a size is assigned to the object. For example, the object size estimator 132 may assign a random size to the object; may assign a size to the object selected using consistent hashing techniques (e.g., one of a set of sizes is assigned based on a hash generated using consistent hashing techniques); may assign a size to the object based on an overall average of sizes corresponding to requested objects; may assign a size to the object based on properties of the object request, such as a distribution (e.g., a hostname), a URL type (e.g., a video URL, an audio URL, etc.), and/or a range header (e.g., a number of bytes indicated in the header); and/or the like. Alternatively, not shown, no size may be assigned to the object.

At block 420, a cache server is selected to handle the object retrieval request based on the assigned size. The cache server may be selected in a manner as described with respect to block 416 using the assigned size instead of an estimated object size.

At block 422, an actual size of the object is determined after object retrieval. For example, the actual object size may be determined after the object is retrieved from the cache data store 128 using the cache key.

At block 424, the cache key is added as a member of the Bloom filter that is associated with a size range that corresponds to the actual object size. For example, the cache key is added as a member of the Bloom filter that is associated with a size range in which the actual object size falls.

At block 426, current load records for the selected cache server are updated based on the actual object size. For example, the assigned size may be subtracted from the current load and the actual object size may be added. After the current load records are updated, the load balancing routine 400 ends, as shown at block 428.

While block 424 is depicted after block 426 in FIG. 4, this is not meant to be limiting. For example, block 426 can be performed before, during, or after block 424.

Example Bloom Filter Membership Test Routine

As described herein, the Bloom filters within a Bloom filter family may each be associated with the same hash functions. Thus, in some embodiments, the object size estimator 132 may implement certain optimizations to reduce latency in the cache server 126 selection process and/or to reduce the amount of computing resources used when selecting the appropriate cache server 126 to service a data object request.

For example, the object size estimator 132 can periodically perform a set union operation using the Bloom filters within a Bloom filter family as an input to form an encompassing Bloom filter. The set union operation may be equivalent to an OR operation and may be applied element by element in the N-bit arrays corresponding to the Bloom filters in the Bloom filter family. Accordingly, the resulting encompassing Bloom filter may be represented by an N-bit array that has logical "1" bit values set in elements that correspond with elements in which at least one input Bloom filter N-bit array has a bit set to logical "1."

As an illustrative example, a second element and a fourth element in the N-bit array representing a first Bloom filter in the Bloom filter family may have bits set to a logical "1" and the remaining bits may be set to a logical "0." A third element and a fourth element in the N-bit array representing a second Bloom filter in the Bloom filter family may have bits set to a logical "1" and the remaining bits may be set to a logical "0." Finally, a fifth element and a tenth element in the N-bit array representing a third Bloom filter in the Bloom filter family may have bits set to a logical "1" and the remaining bits may be set to a logical "0." If the object size estimator 132 performs a set union operation using the first, second, and third Bloom filters, then the resulting encompassing Bloom filter may be represented by an N-bit array that has a bit set to logical "1" in the second, third, fourth, fifth, and tenth elements (e.g., the elements in which at least one Bloom filter N-bit array has a bit set to logical "1") and a bit set to logical "0" in the remaining elements.

If a generated cache key is a member of the encompassing Bloom filter, then this indicates that the generated cache key is possibly a member of one or more Bloom filters in the Bloom filter family. However, if the generated cache key is not a member of the encompassing Bloom filter, then this indicates that the generated cache key is not a member of any Bloom filter in the Bloom filter family. Thus, the encompassing Bloom filter may allow the object size estimator 132 to forgo performing multiple Bloom filter membership tests if the object size estimator 132 determines that the generated cache key is not a member of the encompassing Bloom filter, thereby conserving computing resources. For example, the object size estimator 132 can test whether a generated cache key is a member of the encompassing Bloom filter. If the generated cache key is not a member of the encompassing Bloom filter, then the object size estimator 132 can simply assign a size to the requested data object. Otherwise, if the generated key is a member of the encompassing Bloom filter, then the object size estimator 132 can test cache key membership in one or more of the Bloom filters in the Bloom filter family in a manner as described above. The object size estimator 132 may test cache key membership in individual Bloom filters to identify which Bloom filter, if any, of which the cache key is a member. In some cases, a cache key may be a member of the encompassing Bloom filter, but not a member of any individual Bloom filter. In such a situation, the object size estimator 132 can assign a size to the requested data object instead of estimating a size.

The object size estimator 132 can perform the set union operation each time a Bloom filter in the Bloom filter family is reset and/or receives a new member. Alternatively, the object size estimator 132 can perform the set union operation at set time intervals, at random times, and/or the like.

In further embodiments, the set union operation can be extended across hosts 124. As described herein, multiple hosts 124 may be present to service multiple data object requests simultaneously or nearly simultaneously. Because the hosts 124 may receive different data object requests, the Bloom filters stored in the Bloom filter data store 136 of each host 124 may have different members. Thus, it may be beneficial to combine related Bloom filters (e.g., Bloom filters stored in the various Bloom filter data stores 136 of the hosts 124 that are associated with the same size range), where the resulting combined Bloom filter represents a Bloom filter that would have resulted if one host 124 received all data object requests. The resulting combined Bloom filter may therefore allow each host 124 to provide better data object size estimates.

Accordingly, if the Bloom filters stored in each host 124 are associated with the same hash functions, the object size estimator 132 of one host 124 or a separate component in the CDN service 122 (not shown) can perform a set union operation using a set of related Bloom filters as inputs to form an encompassing related Bloom filter. The object size estimator 132 or separate component can repeat the set union operation for each set of related Bloom filters (e.g., each set of Bloom filters associated with the same size range). Each encompassing related Bloom filter may then be associated with a specific size range. The encompassing related Bloom filters can be stored in each Bloom filter data store 136 for use by the corresponding object size estimator 132. For example, the object size estimator 132 in a particular host 124 can use the encompassing related Bloom filters instead of the Bloom filters originally stored in the Bloom filter data store 136 to test cache key membership and estimate data object sizes.

The object size estimator 132 or separate component can perform the set union operation to form an encompassing related Bloom filter each time a related Bloom filter is reset and/or receives a new member. Alternatively, the object size estimator 132 or separate component can perform the set union operation to form an encompassing related Bloom filter at set time intervals, at random times, and/or the like.

In still further embodiments, the object size estimator 132 of one host 124 or a separate component in the CDN service 122 (not shown) can perform a set union operation using each encompassing related Bloom filter as inputs or each Bloom filter stored in each host 124 as inputs to form an inter-host encompassing Bloom filter. The object size estimator 132 in a particular host 124 can use the inter-host encompassing Bloom filter instead of the encompassing Bloom filter to test cache key membership and estimate data object sizes. For example, the object size estimator 132 can test whether a generated cache key is a member of the inter-host encompassing Bloom filter. If the generated cache key is not a member of the inter-host encompassing Bloom filter, then the object size estimator 132 can simply assign a size to the requested data object. Otherwise, if the generated key is a member of the inter-host encompassing Bloom filter, then the object size estimator 132 can test cache key membership in one or more of the encompassing related Bloom filters in a manner as described above. The object size estimator 132 may test cache key membership in individual encompassing related Bloom filters to identify which encompassing related Bloom filter, if any, of which the cache key is a member. Alternatively, if the generated key is a member of the inter-host encompassing Bloom filter, then the object size estimator 132 can test cache key membership in one or more of the Bloom filters in the Bloom filter family in a manner as described above. The object size estimator 132 may test cache key membership in individual Bloom filters corresponding to a Bloom filter family to identify which Bloom filter, if any, of which the cache key is a member.

Figure 5:
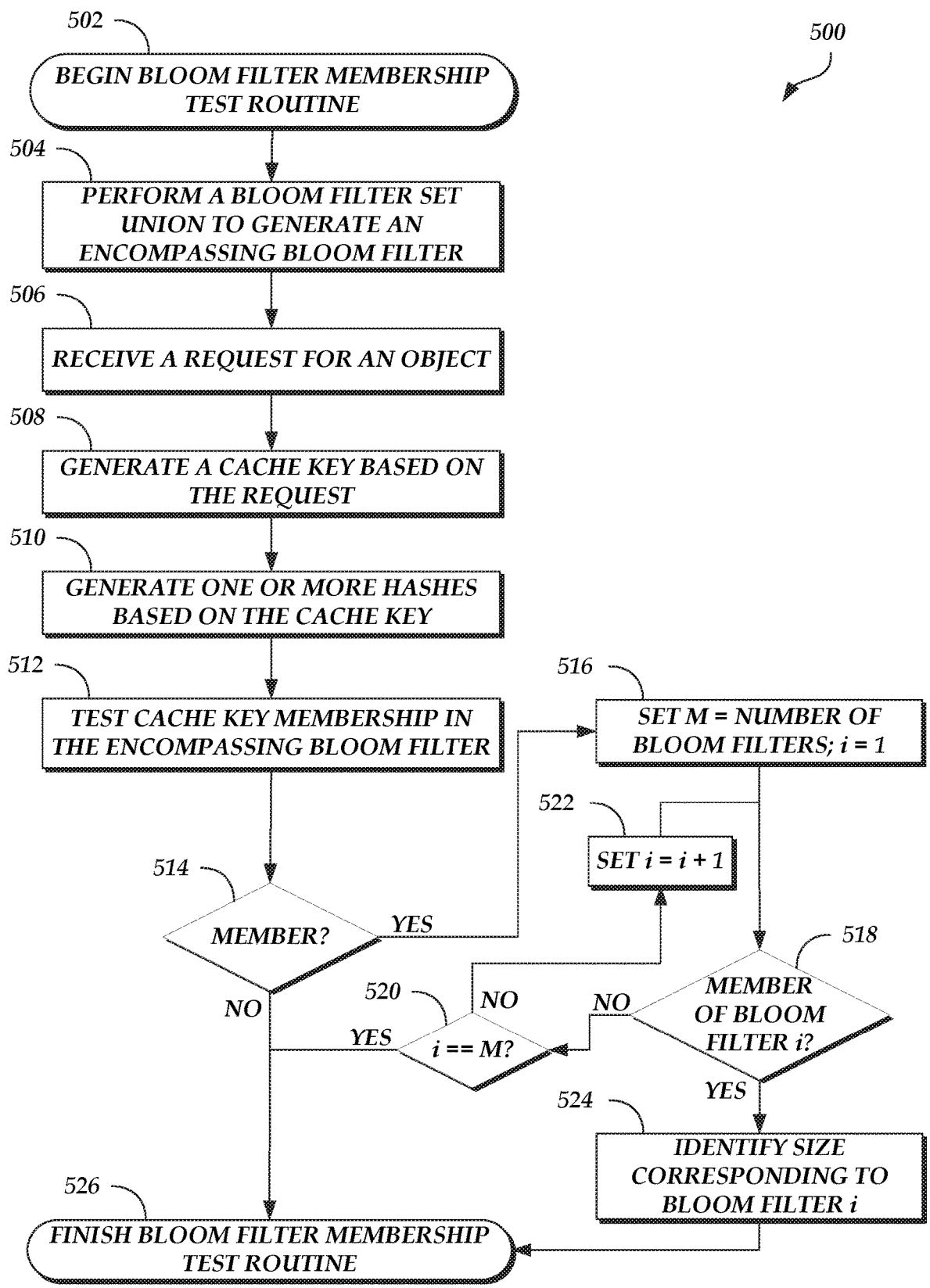
FIG. 5 is a flow diagram depicting a Bloom filter membership test routine illustratively implemented by a POP, according to one embodiment.

FIG. 5 is a flow diagram depicting a Bloom filter membership test routine 500 illustratively implemented by a POP, according to one embodiment. As an example, the POP 120 (e.g., the CDN service 122) of FIG. 1 can be configured to execute the Bloom filter membership test routine 500. The Bloom filter membership test routine 500 may be executed prior to estimating the data object size. The Bloom filter membership test routine 500 begins at block 502.

At block 504, a Bloom filter set union operation is performed to generate an encompassing Bloom filter. The encompassing Bloom filter may indicate whether a cache key is possibly a member of one or more Bloom filters that were combined to form the encompassing Bloom filter or whether the cache key is not a member of any Bloom filter that was combined to form the encompassing Bloom filter.

At block 506, a request for an object is received. The request may include header information and/or a URL that corresponds to a data object.

At block 508, a cache key is generated based on the request. For example, the cache key may be generated based on the header information and/or the URL (e.g., the cache key may be a hash of the header information and/or the URL).

At block 510, one or more hashes are generated based on the cache key. For example, a different hash may be generated for each hash function associated with one or more Bloom filters using the respective hash function.

While block 504 is depicted in FIG. 5 as occurring before blocks 504, 506, 508, and 510, this is not meant to be limiting. For example, block 504 can be performed after blocks 504, 506, 508, and/or 510.

At block 512, cache key membership in the encompassing Bloom filter is tested. For example, the generated hash(es) may each identify an element in an N-bit array that represents the encompassing Bloom filter. If the identified elements in the N-bit array representing the encompassing Bloom filter each have a bit set to logical "1," then the cache key is a member of the encompassing Bloom filter. Otherwise, if any identified element in the N-bit array representing the encompassing Bloom filter has a bit set to logical "0," then the cache key is not a member of the encompassing Bloom filter.

At block 514, a determination is made as to whether the cache key is a member of the encompassing Bloom filter. If the cache key is a member of the encompassing Bloom filter according to the test operation described herein, then the Bloom filter membership test routine 500 proceeds to block 516. Otherwise, if the cache key is not a member of the encompassing Bloom filter according to the test operation described herein, then the cache key is not a member of any Bloom filter that was combined to form the encompassing Bloom filter. Thus, the Bloom filter membership test routine 500 then ends, as shown at block 526.

At block 516, variable M is set equal to the number of Bloom filters and variable i is set equal to 1. The variable i may be used to indicate a particular Bloom filter within a Bloom filter family.

At block 518, a determination is made as to whether the cache key is a member of Bloom filter i. For example, the object size estimator 132 can test membership in Bloom filter i in a manner as described herein. If the cache key is a member of Bloom filter i, then the Bloom filter membership test routine 500 proceeds to block 524. Otherwise, if the cache key is not a member of Bloom filter i, then the Bloom filter membership test routine 500 proceeds to block 520.

At block 520, a determination is made as to whether variable i is equal to variable M. If variables i and M are equal, then the cache key is not a member of any Bloom filter that was combined to form the encompassing Bloom filter. Thus, the Bloom filter membership test routine 500 then ends, as shown at block 526. Otherwise, if variables i and M are not equal, then the Bloom filter membership test routine 500 proceeds to block 522.

At block 522, variable i is incremented by 1. The Bloom filter membership test routine 500 then proceeds back to block 518 such that the object size estimator 132 can test whether the cache key is a member of another Bloom filter in the Bloom filter family.

Example Bloom Filter Creation Routine

As described herein, false positives may occur in which the object size estimator 132 determines that the generated cache key is a member of a Bloom filter when in fact the generated cache key is not a member of the Bloom filter. As a Bloom filter gains members, the rate of false positives may increase. Thus, the object size estimator 132 can periodically reset Bloom filters to reduce the likelihood that a false positive will occur.

For example, the object size estimator 132 can reset a Bloom filter when a threshold period of time from when the Bloom filter was created or last reset has expired. As another example, the object size estimator 132 can reset a Bloom filter when the Bloom filter has gained a threshold number of members. For one or more Bloom filters, the object size estimator 132 may maintain a counter to track the number of Bloom filter members.

A simple reset of Bloom filters, however, may lead to initially poor data object size estimates. For example, if a Bloom filter has no members or only a few members, then the object size estimator 132 may more often assign sizes to data objects rather than estimate sizes for data objects.

Accordingly, in some embodiments, a host 124 can maintain a set of Bloom filters that are each associated with the same size range. However, each Bloom filter in the set may be shifted in time. Thus, the Bloom filters in the set may be active during different time intervals. In particular, one Bloom filter in the set may be active at any given time. A Bloom filter in the set may be active if the object size estimator 132 uses the Bloom filter for testing cache key membership. While one Bloom filter in the set may be active at any given time, the object size estimator 132 may nonetheless add members to one or more Bloom filters during that time. For example, the object size estimator 132 may start adding members to a Bloom filter prior to the time interval during which the Bloom filter becomes active. By adding members to a Bloom filter prior to the time interval during which the Bloom filter becomes active, the object size estimator 132 may be able to provide better data object size estimates once the Bloom filter becomes active because the Bloom filter will already store data representing an approximate or partial data object request history once the Bloom filter becomes active.

After a time interval in which a Bloom filter is active passes, the object size estimator 132 can reset the Bloom filter. At a later time, the object size estimator 132 can reuse the reset Bloom filter by adding members to the Bloom filter and then reactivating the Bloom filter shortly thereafter. Thus, the Bloom filters in the set can be reset, receive members, and be activated in a rotating manner. By reusing the Bloom filters instead of generating new Bloom filters, the CDN service 122 may be able to conserve disk space. By resetting Bloom filters and adding members to the Bloom filters prior to the time that the Bloom filters become active, the object size estimator 132 can provide improved data object size estimates while still reducing the rate of false positives.

As an illustrative example, the Bloom filter data store 136 may store a first Bloom filter associated with a first size range and a second Bloom filter associated with the first size range. The object size estimator 132 may determine that the first Bloom filter will be active from time 0 to time 2, from time 4 to time 6, from time 8 to time 10, and so on. The object size estimator 132 may determine that the second Bloom filter will be active from time 2 to time 4, from time 6 to time 8, from time 10 to time 12, and so on. The object size estimator 132 may continue to add members to the first Bloom filter between times 0 and 2, between times 3 and 6, between times 7 and 10, and so on. Likewise, the object size estimator 132 may continue to add members to the second Bloom filter between times 1 and 4, between times 5 and 8, between times 9 and 12, and so on. Furthermore, the object size estimator 132 may reset the first Bloom filter after times 2, 6, 10, and so on, and may reset the second Bloom filter after times 4, 8, 12, and so on. Thus, when the object size estimator 132 activates either the first Bloom filter or the second Bloom filter, the active Bloom filter will already have one time interval of generated cache keys added as members.

The host 124 can further maintain a set of Bloom filters for each size range. Each set of Bloom filters may have Bloom filters that are reset, start to receive members, or become active at the same time. Alternatively, one or more sets of Bloom filters may be shifted in time such the Bloom filters in the sets are reset, start to receive members, and/or become active at different times.

Figure 6:
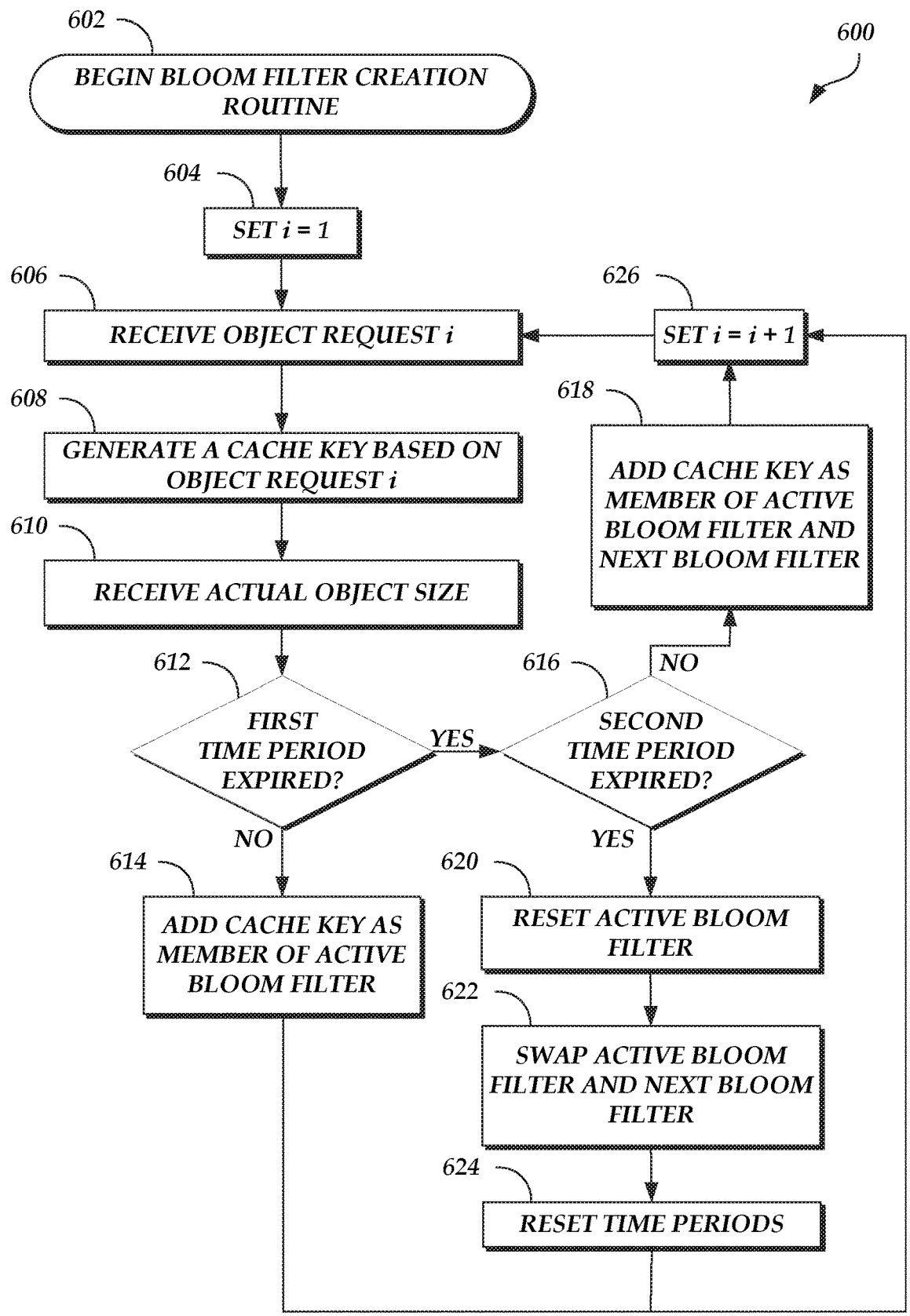
FIG. 6 is a flow diagram depicting a Bloom filter creation routine illustratively implemented by a POP, according to one embodiment.

FIG. 6 is a flow diagram depicting a Bloom filter creation routine 600 illustratively implemented by a POP, according to one embodiment. As an example, the POP 120 (e.g., the CDN service 122) of FIG. 1 can be configured to execute the Bloom filter creation routine 600. The Bloom filter creation routine 600 begins at block 602.

At block 604, variable i is set equal to 1. The variable i may be used to indicate a particular object request.

At block 606, object request i is received. The request may include header information and/or a URL that corresponds to a data object.

At block 608, a cache key is generated based on object request i. For example, the cache key may be generated based on the header information and/or the URL included in object request i (e.g., the cache key may be a hash of the header information and/or the URL).

In an embodiment, the cache key is not a member of any active Bloom filter in a Bloom filter family. For example, the cache key is not a member of any Bloom filter used by the object size estimator 132 to test cache key membership and estimate data object sizes. Thus, the object size estimator 132 may assign a size to the object and wait for an indication of an actual size of the object once the object is delivered to the requesting device.

At block 610, an actual object size is received. In an embodiment, the object size estimator 132 can use the actual object size to identify which active Bloom filter in the Bloom filter family is associated with a size range in which the actual object size falls.

At block 612, a determination is made as to whether a first time period expired. For example, when the first time period expires, one or more of the Bloom filters that follow the active Bloom filters may begin to receive members. If the first time period expired, then the Bloom filter creation routine 600 proceeds to block 616. Otherwise, if the first time period has not expired, then the Bloom filter creation routine 600 proceeds to block 614.

At block 614, the generated cache key is added as a member of an active Bloom filter. For example, the generated cache key may be added to the active Bloom filter that is associated with a size range in which the actual object size falls. After the generated cache key is added as a member, the Bloom filter creation routine 600 proceeds to block 626.

At block 616, a determination is made as to whether a second time period has expired. For example, expiration of the second time period may represent a time when one or more of the active Bloom filters become deactivated and one or more of the next Bloom filters are activated. If the second time period expired, then the Bloom filter creation routine 600 proceeds to block 620. Otherwise, if the second time period has not expired, then the Bloom filter creation routine 600 proceeds to block 618.

At block 618, the generated cache key is added as a member of the active Bloom filter and the next Bloom filter. For example, the generated cache key may be added to the active Bloom filter and the next Bloom filter that are both associated with a size range in which the actual object size falls. After the generated cache key is added as a member, the Bloom filter creation routine 600 proceeds to block 626.

At block 620, the active Bloom filter is reset. For example, the object size estimator 132 may reset the active Bloom filter by changing all of the elements in the N-bit array representing the active Bloom filter that have bits set to logical "1" from logical "1" to logical "0." Thus, the reset active Bloom filter may be represented by an N-bit array that has a logical "0" in each element.

At block 622, the active Bloom filter and the next Bloom filter are swapped. Thus, the active Bloom filter now includes as members cache keys that were added to the next Bloom filter after the first time period expired. The next Bloom filter now is a reset Bloom filter.

At block 624, the time periods are reset. Thus, the first time period and the second time period are no longer expired. As mentioned above, the active Bloom filter now includes as members some cache keys and the active Bloom filter will continue to receive as members additional cache keys until the second period of time expires once again. After the time periods are reset, the Bloom filter creation routine 600 proceeds to block 626.

At block 626, variable i is incremented by 1. The Bloom filter creation routine 600 then proceeds back to block 606 such that the Bloom filter creation routine 600 can be repeated for a new object request.

Example Inter-Host Encompassing Bloom Filter Formation

Figure 7:
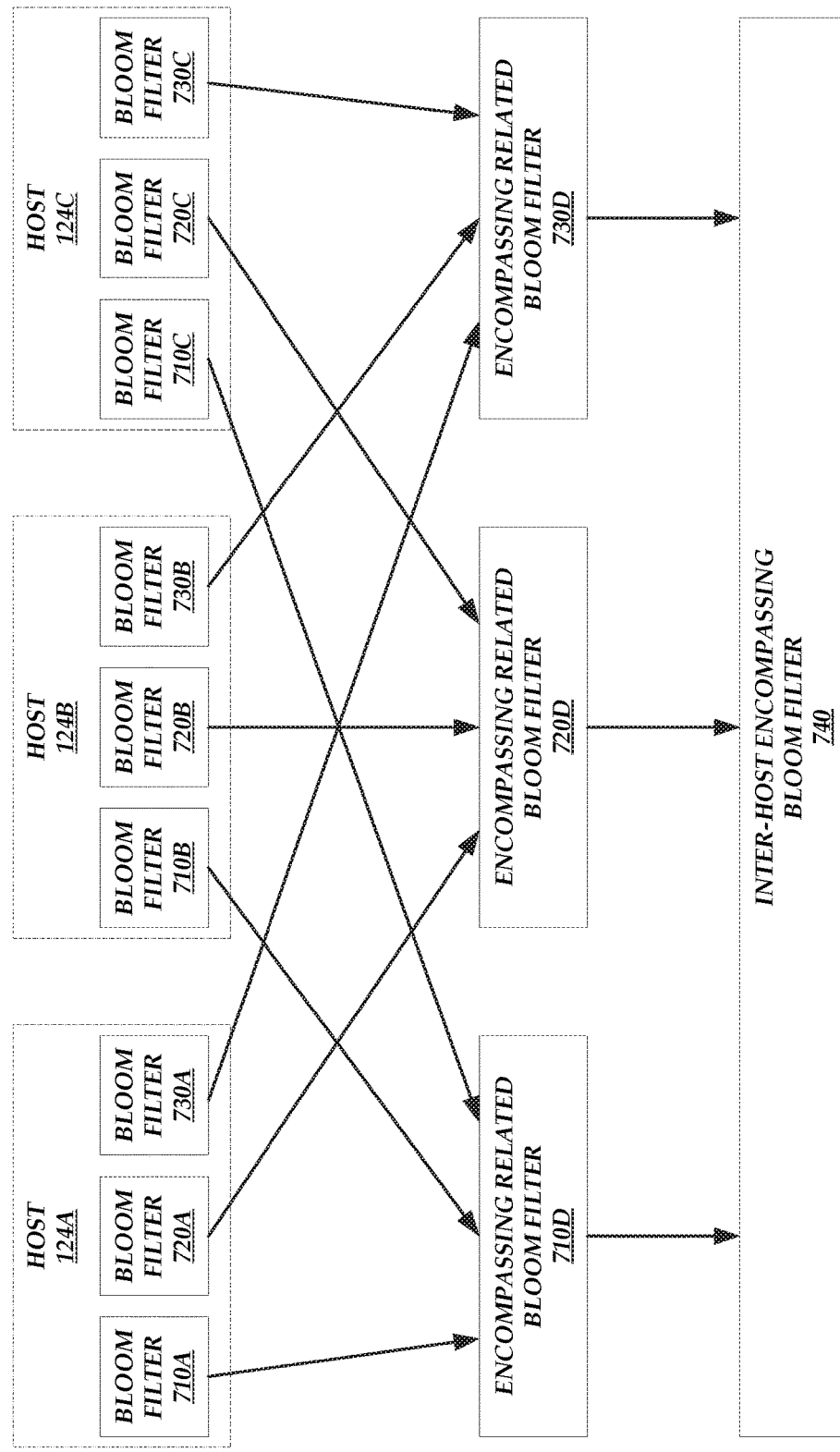
FIG. 7 is a block diagram depicting the formation of an inter-host encompassing bloom filter, according to one embodiment.

FIG. 7 is a block diagram depicting the formation of an inter-host encompassing bloom filter 740, according to one embodiment. As illustrated in FIG. 7, three hosts 124A-C may each store three Bloom filters. For example, host 124A may store Bloom filters 710A, 720A, and 730A. The Bloom filter 710A may be associated with a first size range, the bloom filter 720A may be associated with a second size range, and the Bloom filter 730A may be associated with a third size range. Similarly, host 124B may store Bloom filters 710B, 720B, and 730B, where Bloom filter 710B is associated with the first size range, Bloom filter 720B is associated with the second size range, and Bloom filter 730B is associated with the third size range. Finally, host 124C may store Bloom filters 710C, 720C, and 730C, where Bloom filter 710C is associated with the first size range, Bloom filter 720C is associated with the second size range, and Bloom filter 730C is associated with the third size range.

Because the Bloom filters 710A-C are each associated with the same, first size range, the object size estimator 132 of one of the hosts 124A-C or a separate component in the CDN service 122 (not shown) can perform a set union operation using the Bloom filters 710A-C as inputs to form an encompassing related Bloom filter 710D. The encompassing related Bloom filter 710D may also be associated with the first size range and can represent a Bloom filter that would have resulted if one host 124 received all of the data object requests actually received by each of the hosts 124A-C. The encompassing related Bloom filter 710D can be stored in the Bloom filter data stores 136 of the hosts 124A-C for use by the corresponding object size estimator 132. For example, the object size estimator 132 of the host 124A may use the encompassing related Bloom filter 710D rather than the Bloom filter 710A to estimate data object sizes.

The object size estimator 132 of one of the hosts 124A-C or a separate component in the CDN service 122 (not shown) can repeat the set union operation using the Bloom filters 720A-C as inputs to form an encompassing related Bloom filter 720D and/or using the Bloom filters 730A-C as inputs to form an encompassing related Bloom filter 730D. The encompassing related Bloom filter 720D then is associated with the second size range and the encompassing related Bloom filter 730D is associated with the third size range. The encompassing related Bloom filters 720D and/or 730D may also be stored in the Bloom filter data stores 136 of the hosts 124A-C for use by the corresponding object size estimator 132. For example, the object size estimator 132 of the host 124B may use the encompassing related Bloom filter 720D rather than the Bloom filter 720B to estimate data object sizes and/or may use the encompassing related Bloom filter 730D rather than the Bloom filter 730B to estimate data object sizes.

The object size estimator 132 of one of the hosts 124A-C or a separate component in the CDN service 122 (not shown) can perform an additional set union operation using each of the encompassing related Bloom filters 710D, 720D, and 730D to form the inter-host encompassing Bloom filter 740. The object size estimator 132 of one of the hosts 124A-C can use the inter-host encompassing Bloom filter 740 instead of an encompassing Bloom filter to test cache key membership and estimate data object sizes. For example, the object size estimator 132 of the host 124A can test whether a generated cache key is a member of the inter-host encompassing Bloom filter 740. If the generated cache key is not a member of the inter-host encompassing Bloom filter 740, then the object size estimator 132 can simply assign a size to the requested data object. Otherwise, if the generated key is a member of the inter-host encompassing Bloom filter 740, then the object size estimator 132 can test cache key membership in one or more of the encompassing related Bloom filters 710D, 720D, and/or 730D in a manner as described above. The object size estimator 132 may test cache key membership in individual encompassing related Bloom filters 710D, 720D, and/or 730D to identify which encompassing related Bloom filter, if any, of which the cache key is a member. Alternatively, if the generated key is a member of the inter-host encompassing Bloom filter 740, then the object size estimator 132 of the host 124A can test cache key membership in one or more of the Bloom filters 710A, 720A, and/or 730A in the Bloom filter family in a manner as described above. The object size estimator 132 may test cache key membership in individual Bloom filters 710A, 720A, and/or 730A corresponding to a Bloom filter family to identify which Bloom filter, if any, of which the cache key is a member.

Alternatively, not shown, the object size estimator 132 of one of the hosts 124A-C or a separate component in the CDN service 122 (not shown) can perform an additional set union operation using the individual Bloom filters 710A-C, 720A-C, and 730A-C as inputs to form the inter-host encompassing Bloom filter 740. For example, the object size estimator 132 or separate component can perform the set union operation using each of the individual Bloom filters 710A-C, 720A-C, and 730A-C together as inputs to form the inter-host encompassing Bloom filter 740. As another example, the object size estimator 132 or separate component can perform the set union operation using the Bloom filters 710A, 720A, and 730A as inputs to form an intermediate Bloom filter. The object size estimator 132 or separate component can then repeat the set union operation using the Bloom filters 710B, 720B, and 730B as inputs and using the Bloom filters 710C, 720C, and 730C as inputs to form additional intermediate Bloom filters. The object size estimator 132 or separate component can then perform the set union operation using the intermediate Bloom filters as inputs to form the inter-host encompassing Bloom filter 740.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of balancing a load, the method comprising:
   receiving, from a user device, a request for a data object on a content delivery network (CDN) service, wherein the CDN service is present on the one or more computing devices at a point of presence (POP);
   hashing a header of, but not a URL of, the request to generate a cache key;
   hashing the cache key to generate a first hash;
   retrieving a plurality of Bloom filters, wherein individual Bloom filters in the plurality are represented by an N-bit array;
   testing whether the cache key is a member of any Bloom filter in the plurality of Bloom filters based on an analysis of the first hash and the N-bit arrays that represent individual Bloom filters;
   determining that the cache key is a member of a first Bloom filter in the plurality of Bloom filters, wherein the first Bloom filter is associated with a first size range;
   estimating a size of the data object to be a first size, wherein the first size corresponds with the first size range;
   estimating an added load to one or more cache servers based on the first size; and
   selecting a first cache server in the one or more cache servers to service the request based on the estimated added load, wherein the first cache server is configured to retrieve the data object from a cache data store that stores the data object in association with the cache key using the cache key.

2. The computer-implemented method of claim 1, further comprising:
   receiving, from the user device, a second request for a second data object;
   generating a second cache key based on the second request;
   generating a second hash using the second cache key;
   determining that the second cache key is not a member of any Bloom filter in the plurality of Bloom filters;
   assigning a second size to the second data object;
   estimating a second added load to the one or more cache servers based on the assigned second size; and
   selecting a second cache server in the one or more cache servers to service the second request based on the estimated second added load.

3. The computer-implemented method of claim 2, further comprising:
   receiving an indication of an actual size of the second data object;
   identifying a second Bloom filter in the plurality of Bloom filters that is associated with a second size range within which the actual size falls; and
   adding the second cache key as a member of the second Bloom filter.

4. The computer-implemented method of claim 2, wherein the second size comprises one of a random size, a size selected using consistent hashing techniques, an average size of data objects, or a size based on properties of the second request.

5. The computer-implemented method of claim 1, wherein the estimated added load is the first size.

6. A system for balancing a load, the system comprising:
   a Bloom filter data store that is configured to store a plurality of Bloom filters, wherein individual Bloom filters in the plurality of Bloom filters is associated with a size range; and
   a computing device comprising a processor in communication with the Bloom filter data store and configured with specific computer-executable instructions to:
      receive, from a user device, a request for a data object;
      hash a header of, but not a URL of, the request to generate a cache key;
      hash the cache key to generate a first hash;

retrieve the plurality of Bloom filters;
test whether the cache key is a member of any Bloom filter in the plurality of Bloom filters using the first hash;
determine that the cache key is a member of a first Bloom filter in the plurality of Bloom filters, wherein the first Bloom filter is associated with a first size range;
estimate that the data object is a first size, wherein the first size corresponds with the first size range;
estimate an added load to one or more cache servers based on the first size; and
select a first cache server in the one or more cache servers to service the request based on the estimated added load, wherein the first cache server is configured to retrieve the data object from a cache data store that stores the data object in association with the cache key using the cache key.

7. The system of claim 6, wherein the computing device is further configured with specific computer-executable instructions to:
receive, from the user device, a second request for a second data object;
generate a second cache key based on the second request;
generate a second hash using the second cache key;
determine that the second cache key is not a member of any Bloom filter in the plurality of Bloom filters;
assign a second size to the second data object;
estimate a second added load to the one or more cache servers based on the assigned second size; and
select a second cache server in the one or more cache servers to service the second request based on the estimated second added load.

8. The system of claim 7, wherein the computing device is further configured with specific computer-executable instructions to:
receive an indication of an actual size of the second data object;
identify a second Bloom filter in the plurality of Bloom filters that is associated with a second size range within which the actual size falls; and
add the second cache key as a member of the second Bloom filter.

9. The system of claim 7, wherein the second size comprises one of a random size, a size selected using consistent hashing techniques, an average size of data objects, or a size based on properties of the second request.

10. The system of claim 6, wherein the estimated added load is the first size.

11. The system of claim 10, wherein the computing device is further configured with specific computer-executable instructions to:
determine an average current load of the one or more cache servers; and
select the first cache server to service the request in response to a determination that a sum of the estimated added load of the first cache server and a current load of the first cache server is less than the average current load.

12. The system of claim 10, wherein the computing device is further configured with specific computer-executable instructions to select the first cache server to service the request in response to a determination that the estimated added load of the first cache server and the current load of the other cache servers in the one or more cache servers are within a threshold value.

13. The system of claim 6, wherein the computing device is further configured with specific computer-executable instructions to:
perform a set union operation using the plurality of Bloom filters to form an encompassing Bloom filter;
determine that the cache key is a member of the encompassing Bloom filter; and
test whether the cache key is a member of any Bloom filter in the plurality of Bloom filters in response to the determination that the cache key is a member of the encompassing Bloom filter.

14. The system of claim 6, wherein the computing device is further configured with specific computer-executable instructions to:
perform a set union operation using the plurality of Bloom filters and a second plurality of Bloom filters associated with a second system to form an inter-host encompassing Bloom filter;
determine that the cache key is a member of the inter-host encompassing Bloom filter; and
test whether the cache key is a member of any Bloom filter in the plurality of Bloom filters in response to the determination that the cache key is a member of the inter-host encompassing Bloom filter.

15. The system of claim 6, wherein a second Bloom filter in the plurality of Bloom filters is associated with the first size range, and wherein the first Bloom filter and the second Bloom filter are shifted in time such that the computing device alternates between using the first Bloom filter and the second Bloom filter to determine whether data object requests correspond to the first size range.

16. The system of claim 6, wherein the first size is one of a maximum size in the first size range, a minimum size in the first size range, or an average size in the first size range.

17. Non-transitory, computer-readable storage media comprising computer-executable instructions for balancing a load, wherein the computer-executable instructions, when executed by a computer system, cause the computer system to:
receive a request for a data object;
hash a header of, and not a URL of, the request to generate a cache key;
hash the cache key to generate a first hash;
retrieve a plurality of probabilistic filters;
determine that the cache key is a member of a first probabilistic filter in the plurality of probabilistic filters using the first hash, wherein the first probabilistic filter is associated with a first size range;
estimate that the data object is a first size, wherein the first size corresponds with the first size range;
estimate an added load to one or more cache servers based on the first size; and
select a first cache server in the one or more cache servers to service the request based on the estimated added load, wherein the first cache server is configured to retrieve the data object from a cache data store that stores the data object in association with the cache key using the cache key.

18. The non-transitory, computer-readable storage media of claim 17, wherein the estimated added load is the first size.

19. The non-transitory, computer-readable storage media of claim 18, wherein the computer-executable instructions further cause the computer system to:
determine an average current load of the one or more cache servers; and select the first cache server to service the request in response to a determination that a sum of the estimated added load of the first cache server and a current load of the first cache server is less than the average current load.

20. The non-transitory, computer-readable storage media of claim 17, wherein the first probabilistic filter is one of a Bloom filter or a Cuckoo filter.

* * * * *